(12) United States Patent
Fulbright

(10) Patent No.: US 11,565,813 B2
(45) Date of Patent: Jan. 31, 2023

(54) SWARM-BASED FIREFIGHTING DRONE AND MASS AERIAL DROP SYSTEM AND METHOD

(71) Applicant: UNIVERSITY OF SOUTH CAROLINA, Columbia, SC (US)

(72) Inventor: Ron Fulbright, Chesnee, SC (US)

(73) Assignee: University of South Carolina, Columbia, SC (US)

( * ) Notice: Subject to any disclaimer, the term of this patent is extended or adjusted under 35 U.S.C. 154(b) by 558 days.

(21) Appl. No.: 16/589,405

(22) Filed: Oct. 1, 2019

(65) Prior Publication Data
US 2020/0140087 A1    May 7, 2020

Related U.S. Application Data

(60) Provisional application No. 62/754,839, filed on Nov. 2, 2018, provisional application No. 62/754,790, filed
(Continued)

(51) Int. Cl.
*B64C 39/02* (2006.01)
*B64D 1/16* (2006.01)
(Continued)

(52) U.S. Cl.
CPC .............. *B64D 1/16* (2013.01); *A62C 3/0235* (2013.01); *B60L 50/66* (2019.02); *B60L 53/80* (2019.02); *B64C 39/024* (2013.01); *B64D 29/04* (2013.01); *B64D 47/00* (2013.01); *B64D 47/08* (2013.01); *B60L 2200/10* (2013.01); *B64C 2201/027* (2013.01); *B64C 2201/042* (2013.01);
(Continued)

(58) Field of Classification Search
CPC ...... B64D 1/16; B64D 29/04; B64D 2221/00; B60L 50/66; B60L 53/80; B64C 2201/027; B64C 2201/042; B64C 2201/108; B64C 2201/12; B64C 2201/143
See application file for complete search history.

(56) References Cited

U.S. PATENT DOCUMENTS

2014/0374532 A1* 12/2014 Duffy ...................... B64C 37/02
                                                              244/2
2016/0039300 A1*  2/2016 Wang .................... B64C 39/024
                                                              244/58
(Continued)

*Primary Examiner* — Tye William Abell
(74) *Attorney, Agent, or Firm* — Dority & Manning, P.A.

(57) ABSTRACT

Presently disclosed subject matter integrates a method of using thousands of semi-autonomous unmanned aerial vehicles, herein called drones, to deliver vastly superior amounts of fire retardant over substantially larger and variably-shaped drop patterns. Each drone is able to swap its own batteries with freshly charged batteries and each drone is able to refill its container with water or fire retardant. Once launched, a swarm of drones can perform repeated trips from the water/retardant source to the fire without human involvement other than the high-level tasking of where to drop the retardant. Once a general drop destination and drop pattern shape is designated, the swarm can transport retardant to that location, form itself into the desired drop shape, and deploy retardant. The drone body is designed to be modular so different components can be attached with ease and no special training or knowledge required.

30 Claims, 14 Drawing Sheets

Related U.S. Application Data on Nov. 2, 2018, provisional application No. 62/754,806, filed on Nov. 2, 2018, provisional application No. 62/754,830, filed on Nov. 2, 2018, provisional application No. 62/754,820, filed on Nov. 2, 2018, provisional application No. 62/754,797, filed on Nov. 2, 2018, provisional application No. 62/754,827, filed on Nov. 2, 2018.

(51) Int. Cl.
| | | |
|---|---|---|
| *B64D 47/08* | (2006.01) | |
| *B64D 29/04* | (2006.01) | |
| *B60L 50/60* | (2019.01) | |
| *B60L 53/80* | (2019.01) | |
| *B64D 47/00* | (2006.01) | |
| *A62C 3/02* | (2006.01) | |

(52) U.S. Cl.
CPC .... *B64C 2201/108* (2013.01); *B64C 2201/12* (2013.01); *B64C 2201/143* (2013.01); *B64C 2211/00* (2013.01); *B64D 2221/00* (2013.01)

(56) References Cited

U.S. PATENT DOCUMENTS

| | | | |
|---|---|---|---|
| 2016/0244160 A1* | 8/2016 | Colten | B60F 5/02 |
| 2017/0092109 A1* | 3/2017 | Trundle | G08B 25/006 |
| 2019/0127063 A1* | 5/2019 | Gozluklu | B64C 37/02 |
| 2019/0168036 A1* | 6/2019 | Conboy | G08B 25/10 |

* cited by examiner

SWARM-BASED FIREFIGHTING DRONE AND MASS AERIAL DROP SYSTEM AND METHOD

PRIORITY CLAIMS

This application claims filing benefit of U.S. Provisional Patent Application Ser. No. 62/754,797, entitled "Swarm-Based Fire Fighting;" and claims filing benefit of U.S. Provisional Patent Application Ser. No. 62/754,790, entitled "Swarm-Based Material Supply;" and claims filing benefit of U.S. Provisional Patent Application Ser. No. 62/754,827, entitled "Exchangeable Drone Power Modules;" and claims filing benefit of U.S. Provisional Patent Application Ser. No. 62/754,830, entitled "Modular Drone Rotor Nacelles;" and claims filing benefit of U.S. Provisional Patent Application Ser. No. 62/754,839, entitled "Modular Drone Wing Attachments;" and claims filing benefit of U.S. Provisional Patent Application Ser. No. 62/754,806, entitled "Stackable Drone Battery Modules;" and claims filing benefit of U.S. Provisional Patent Application Ser. No. 62/754,820, entitled "Autonomous Hot-Swappable Drone Batteries," all of which have filing dates of Nov. 2, 2018, and all of which are fully incorporated herein by reference for all purposes.

BACKGROUND OF THE PRESENTLY DISCLOSED SUBJECT MATTER

Wildfires tend to extend over a large geographical area and proceed along several highly variable fronts simultaneously. Large fires often burn for several weeks and cause billions of dollars of damage. Fighting a large fire requires hundreds of millions of dollars and the effort of hundreds, if not thousands, of people. Currently, a variety of airborne vehicles are used to drop fire retardant on wildfires. The largest is based on a Boeing 747 body and can deliver up to 19,000 gallons of retardant per sortie. Other "air tankers" are based on DC-10 and smaller airframes and can deliver 1,200 to 12,000 gallons. Helicopter-carried "Bambi buckets" can deliver a few hundred gallons per sortie (with a widest range of about 72 to 2600 gallons). However, these vehicles are costly to purchase, maintain, and operate. The largest airtankers cost hundreds of millions of dollars, and the helicopters cost several million dollars each. Furthermore, a single air-drop vehicle can cover only a relatively small area of land, and the "drop patterns" of these vehicles are straight and narrow rectangles. Because of the cost and the fact that they require human pilots, the idea of operating a large number of these vehicles is not imaginable.

For fighting wildfires, the primary problems to overcome are:
- lift-capacity of existing drones is limited (most lift only a few pounds at most)
- flight-time of drones is limited (15-30 minutes is typical; only a few pounds of weight)
- heavy-lift drones are expensive making the cost of a swarm of thousands impractical
  - Existing drones capable of lifting several hundred pounds costs $300,000-$400,000 each making a 1,000-drone swarm cost $300 million
  - Goal is to use simple, low-cost, disposable design/materials so the drone will cost below $10,000 each to build making a 1,000-drone swarm cost $10 million and a 10,000-drone swarm cost $100 million.
- drones must self-service and not require human intervention on every sortie
- drones must be easy to repair and able to be repaired by untrained personnel
- drones must be easily configurable to meet different mission requirements Although future drone technology will be capable of lifting much more weight as time progresses, current heavy-lift drones are capable of lifting and transporting hundreds of pounds of cargo (equating to dozens or hundreds of gallons of fire retardant). With a lift capacity of around 800-900 pounds (about 100 gallons), a swarm of 1,000 drones can deliver 100,000 gallons per sortie of fire retardant to a fire, or five times more than the largest airtanker currently used. A swarm of 10,000 drones can deliver 1,000,000 gallons of fire retardant, the equivalent of 50 of the largest airtankers.

Presently disclosed subject matter relates to devices, systems, and methods for using up to thousands of semi-autonomous unmanned aerial vehicles (UAVs) and unmanned aerial systems (UASs) (hereafter called drones) to deliver vastly superior amounts of fire retardant (or other material delivery) over substantially larger and variably-shaped drop patterns. A large number of drones is called a swarm.

Every year, wildfires cause billions of dollars of damage and fighting them costs State and Federal governments hundreds of millions of dollars. Wildfires tend to extend over a large geographical area and proceed along several highly variable fronts simultaneously. Large fires often burn for several weeks and cause billions of dollars of damage. Fighting a large fire requires hundreds of millions of dollars and the effort of hundreds, if not thousands, of people. Because of the cost, and the fact that they require human pilots, the idea of operating a large number of these aforementioned vehicles is not imaginable. In addition, there are hundreds, if not thousands, of drone companies in existence but none known produce a drone capable of lifting the required weight nor operating autonomously in large numbers.

The military spends billions of dollars on material supply operations. Emergency response agencies and local governments spend hundreds of millions of dollars in supply logistics for each disaster. The civilian population performs the equivalent of hundreds of millions of dollars of material supply in the response to disasters such as hurricanes and floods.

Drones are powered by an on-board power module. Technology currently employed in power modules include: electrical batteries, fuel cells (e.g., hydrogen, liquid hydrogen/oxygen), internal combustion (e.g., gasoline, diesel, alcohol), thermionic, and turbine (e.g., alcohol turbine). Different power module types are useful for some applications and not for others. Currently, each drone developed for an application is designed to use one and only one type of power source.

Drones use rotating propellers (i.e., rotors) to generate upward and forward thrust needed to maintain flight. Current drones are designed to have multiple rotors; however, the number of rotors is fixed. Often, the mission does not require all rotors, yet the fixed design requires the drone to carry the unnecessary rotors anyway. Other missions require extended lift capability facilitated by additional rotors, but fixed designs do not permit the drone to be configured with the needed extra rotors. Existing drones have a fixed number and type of rotors. Changing the rotors on existing drones requires re-design and re-manufacture of the drone. The presently disclosed subject matter described herein allows the drone to be configured easily by simply plugging in as many rotors, of particular type required, as needed to meet mission objectives.

Drones use rotors to generate upward and forward thrust needed to maintain flight. Airplanes use engines of various technologies for forward thrust and wings to generate lift by air flowing over the curved wing surface. Some drones currently existing use wings; however, the wings are fixed and unable to be removed.

Operational time of battery-powered drones is limited by the lifetime of the charge in the batteries. Adding batteries to the drone would extend operational time, but existing drones have batteries encapsulated within the body or framework of the drone making it impossible to add batteries. Current "swarm" technology systems may consist of a few dozen light-weight/miniature drones requiring significant human effort to recover, recharge, prepare, and launch a next sortie.

To facilitate fully autonomous operation, drones must be able to exchange spent batteries with charged batteries without human interaction. In existing drones, batteries are encapsulated within the body or framework of the drone making it necessary for a human or a robotic manipulator to perform several mechanical operations to replace the battery requiring the drone to be taken out of operation during the process. The presently disclosed subject matter disclosed per some embodiments herein involves two or more battery modules mounted on the drone body in such a way so the drone can autonomously change its own batteries.

SUMMARY OF THE PRESENTLY DISCLOSED SUBJECT MATTER

Aspects and advantages of the presently disclosed subject matter will be set forth in part in the following description, or may be apparent from the description, or may be learned through practice of the presently disclosed subject matter.

Broadly speaking, the presently disclosed subject matter relates to integrated systems, devices, and methods for swarm-based firefighting drones and mass aerial drop systems and methods.

Another presently disclosed broader object is to provide simple, low-cost, disposable design/materials for drones capable of lifting several hundred pounds or more.

Yet another aspect of the presently disclosed subject matter is to improve technology areas related to self-service mass drone operation so as to not require human intervention on every sortie.

Still other aspects of the presently disclosed subject matter relate to innovations in drones so that they will be easy to repair and able to be repaired by untrained personnel.

Some embodiments of presently disclosed subject matter relate to drone systems which are easily configurable to meet different mission requirements.

A swarm of drones in some embodiments per presently disclosed subject matter may autonomously organize itself into any shape/volume necessary for the mission, even splintering into independent sub-groups. Furthermore, each drone in some presently disclosed embodiments may be capable of re-supplying itself without human involvement (i.e., continuous operational tempo).

Some presently disclosed subject matter relates to drone operations where each drone in the swarm is semi-autonomous (i.e., it can fly a mission profile, avoid collisions, and coordinate movements with other drones in the swarm).

Still further, presently disclosed subject matter in part may relate to improvement in the state of the art for modular devices. Some such subject matter may refer in pertinent part to exchangeable drone power modules. Other such subject matter may refer in pertinent part to modular rotor assemblies (i.e., rotor nacelles, and hereinafter called rotor nacelles), so that a desired number of rotors can be used for a given drone. Still other such subject matter may refer in pertinent part to modular wing and/or engine attachments which may in some locations on a drone be used in place of a modular rotor. Yet other such subject matter may refer in pertinent part to modular stackable batteries, which in some instances may involve autonomous hot-swappable drone batteries.

The presently disclosed subject matter described herein for some exemplary embodiments may relate to a method of using thousands of heavy-lift semi-autonomous unmanned aerial vehicles, herein also called drones, to deliver vastly superior amounts of fire retardant over substantially larger and variably-shaped drop patterns to fight wildfires, or to deliver vastly superior amounts of material supply during various military operations, emergency response to disasters affecting a large geographical area such as fires, earthquakes, hurricanes, and floods, etc. A large number of drones is called a swarm. For fire-fighting applications, the use of thousands of drones is envisioned but there is no practical limit to the number of drones used. A swarm of 1,000 drones can deliver 100,000 gallons per sortie of fire retardant to a fire, or five times more than the largest airtanker currently used. A swarm of 10,000 drones can deliver 1,000,000 gallons of fire retardant, the equivalent of 50 of the largest airtankers. The use of a swarm of semi-autonomous firefighting drones affords a continuous operational tempo with each sortie able to deliver thousands of times the amount of retardant as conventional vehicles while costing $\frac{1}{10}$ to $\frac{1}{100}$ of the cost.

The presently disclosed subject matter disclosed per some exemplary embodiments herein involves a power-agnostic drone design able to accommodate any power module type in a plug-and-play fashion. The drone itself requires electrical power provided to internal components by a common power bus. Each power module, no matter what the technology used within, supplies electrical power to the common power bus. The drone is fitted with mechanical and electrical connections facilitating the mating of the power module to the drone. Modular power modules implemented in this manner allows one to choose the appropriate power technology for the mission and allows one to quickly swap out power modules for a fresh power module of the same type or for a power module of a different type.

The presently disclosed subject matter described per some exemplary embodiments herein is of a drone design to allow rotor nacelles to be easily attached and detached (plug-and-play style) from the drone body. The ability to easily attach rotor nacelles also allows different kinds of rotors to be fitted to the drone depending on mission requirements. Furthermore, modular rotor nacelles allow the drone to take advantage of newly emerging rotor technology.

The presently disclosed subject matter herein described per some exemplary embodiments is of a drone design allowing wings to be easily attached and detached as desired. Wings are not needed for some missions while for other missions, wings provide important performance enhancements. The presently disclosed subject matter herein described per some exemplary embodiments allows the drone to be configured as needed to meet mission objectives.

This presently disclosed subject matter per some exemplary embodiments describes a method by which drones exchange spent battery modules with charged battery modules without human interaction and without powering-down the drone. Autonomous battery swapping in this manner allows drones to operate at a continuous operational tempo.

One presently disclosed exemplary embodiment relates to an integrated modular drone system configurable to meet different mission requirements. Such system preferably comprises at least one modular drone having a drone body supporting at least one removable power module thereon; a control module supported on such drone body for controlling operation of such drone; a plurality of modular rotor nacelle receivers supported on such drone body; and at least one modular rotor nacelle for being removably mechanically and electrically connected with at least one of such modular rotor nacelle receivers.

It is to be understood from the complete disclosure herewith that the presently disclosed subject matter equally relates to both apparatus and corresponding and related methodology.

One presently disclosed exemplary methodology preferably relates to an integrated modular drone system method, configurable to meet different mission requirements. Such method preferably comprises providing at least one modular drone having a drone body supporting at least one removable power module thereon, with a control module supported on such drone body for controlling operation of such drone, and with a plurality of modular rotor nacelle receivers supported on such drone body; providing a plurality of modular rotor nacelles for being removably mechanically and electrically connected with corresponding modular rotor nacelle receivers; and selectively outfitting such modular drone with a selected number of such modular rotor nacelles, configured to meet mission requirements of such drone system.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which.

Figure 1A:
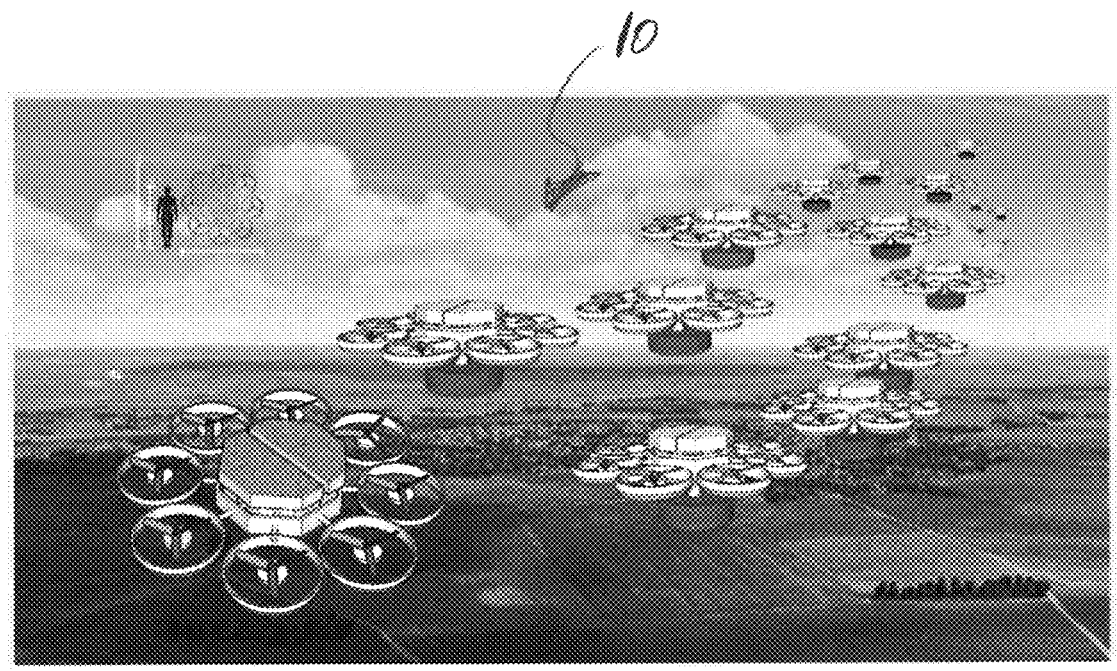
FIG. 1A illustrates the presently disclosed concept of a large number of drones each carrying substantial amounts of fire retardant en route to a fire or drop zone, or carrying other material to be delivered.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to swarm-based firefighting drone and mass aerial drop systems, and related and corresponding methodologies.

The presently disclosed subject matter described herein per some exemplary embodiments is a method of using thousands of heavy-lift semi-autonomous drones to deliver vastly superior amounts of fire retardant over substantially larger and variably-shaped drop patterns to fight wildfires, or to deliver vastly superior amounts of material supply during various military operations, emergency response to disasters affecting a large geographical area, such as fires, earthquakes, hurricanes, and floods, etc.

The presently disclosed subject matter described herein is per some exemplary embodiments a method of using thousands of semi-autonomous drones to deliver vastly superior amounts of fire retardant over substantially larger and variably-shaped drop patterns, or to deliver vastly superior amounts of material supply during various types of operations.

Although future drone technology will be capable of lifting much more weight, current heavy-lift drones are capable of lifting and transporting hundreds of pounds of cargo (e.g., equating to dozens or hundreds of gallons of fire retardant). For fire-fighting applications, the use of swarms of drones is envisioned but there is no practical limit to the number of drones used.

Each drone in the swarm is semi-autonomous meaning it can fly a mission profile, avoid collisions, and coordinate movements with other drones in the swarm. Each drone is able to swap its own batteries with freshly charged batteries and each drone is able to refill its container with water or fire retardant. For example, batteries (battery modules) can be mounted on the exterior of the body, where the drone "docks" with recharged batteries held in a recharging fixture and the drone remains in flight and operational during the battery exchange. This allows the recharging "station" to be anywhere including being airborne (e.g., carried by other drones, balloons, or aircraft) near the mission's operational site, which is advantageous because the drone does not have to return to base. Therefore, once launched, the swarm of drones can perform repeated trips from the water/retardant source to the fire without human involvement other than the high-level tasking of where to drop the retardant. Once a general drop destination and drop pattern shape is designated, the swarm can transport retardant to that location, form itself into the desired drop shape, and deploy retardant. Being able to modify the drop-pattern shape allows the swarm to tailor the application of retardant to match the constantly evolving shape of the fire line. Since fires often proceed along multiple fronts, the swarm can be split into two or more groups to apply retardant in as many areas as needed.

Unlike conventional fire-fighter aerial equipment, the cost of each drone is expected to be a few thousand dollars (possible into the low tens of thousands of dollars). Therefore, a swarm of 1,000 drones is likely to cost about the same as one fire-fighting helicopter yet be able to deliver over 1,000 times more retardant.

A swarm can drop retardant on a fire in a continuous fashion, rather than the individual drops possible using current fire-fighting aerial vehicles. The relative low-cost of each drone makes them disposable. In the harsh environment surrounding a wildfire, the loss of several drones is likely. However, the large number of drones in a swarm makes the swarm resilient in the face of such losses and the relative low cost of each drone makes replacing lost drones affordable.

The use of a swarm of semi-autonomous fire-fighting drones affords a continuous operational tempo with each sortie able to deliver thousands of times the amount of retardant as conventional vehicles while costing $\frac{1}{10}$ to $\frac{1}{100}$ of the cost.

Each drone in the swarm is semi-autonomous meaning it can fly a mission profile, avoid collisions, and coordinate movements with other drones in the swarm. Each drone is able to swap its own batteries with freshly charged batteries and each drone is able to refill its container with water or fire retardant. Therefore, once launched, the swarm of drones can perform repeated trips from the water/retardant source to the fire without human involvement other than the high-level tasking of where to drop the retardant. Once a general drop destination and drop pattern shape is designated, the swarm can transport retardant to that location, form itself into the desired drop shape, and deploy retardant. Being able to modify the drop-pattern shape allows the swarm to tailor the application of retardant to match the constantly evolving shape of the fire line. Since fires often proceed along multiple fronts, the swarm can be split into two or more groups to apply retardant in as many areas as needed.

Unlike conventional fire-fighter aerial equipment, the cost of each drone is expected to be a few thousand dollars (possible into the low tens of thousands of dollars). Therefore, a swarm of 1,000 drones is likely to cost about the same as one fire-fighting helicopter yet be able to deliver over 1,000 times more retardant.

A swarm can drop retardant on a fire in a continuous fashion, rather than the individual drops possible using current fire-fighting aerial vehicles. The relative low-cost of each drone makes them disposable. In the harsh environment surrounding a wildfire, the loss of several drones is likely. However, the large number of drones in a swarm makes the swarm resilient in the face of such losses and the relative low cost of each drone makes replacing lost drones affordable.

Figure 1B:
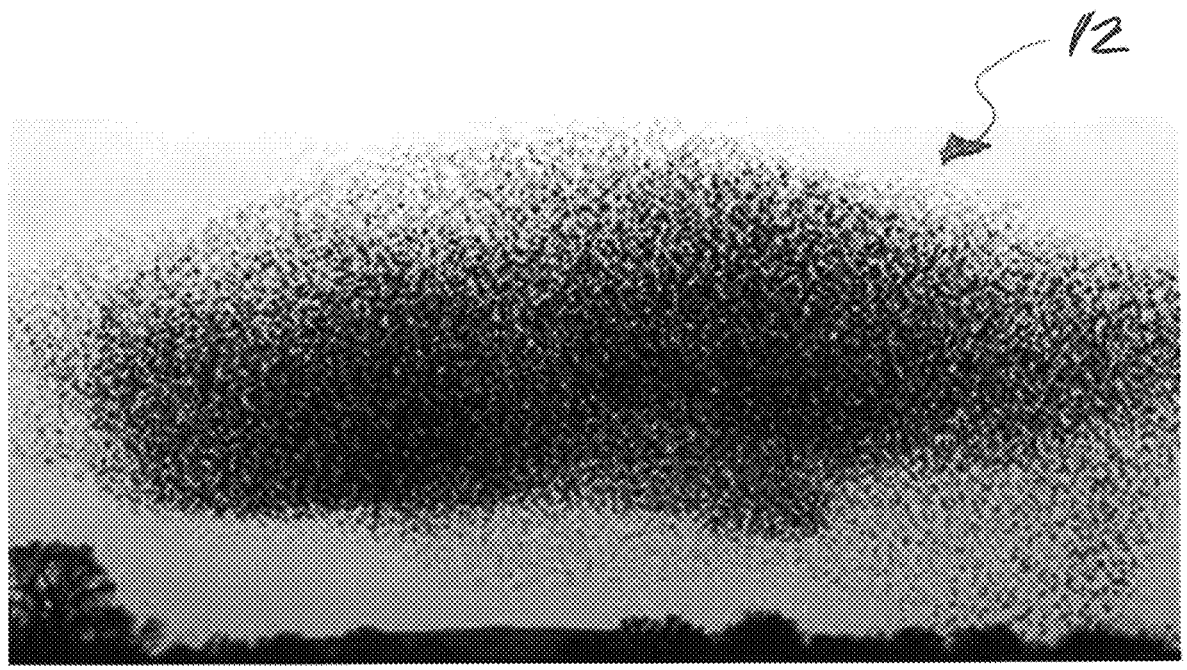
FIG. 1B represents an embodiment of a swarm of semi-autonomous drones, such as for firefighting or load delivery in other alternative contexts.
Figure 1C:
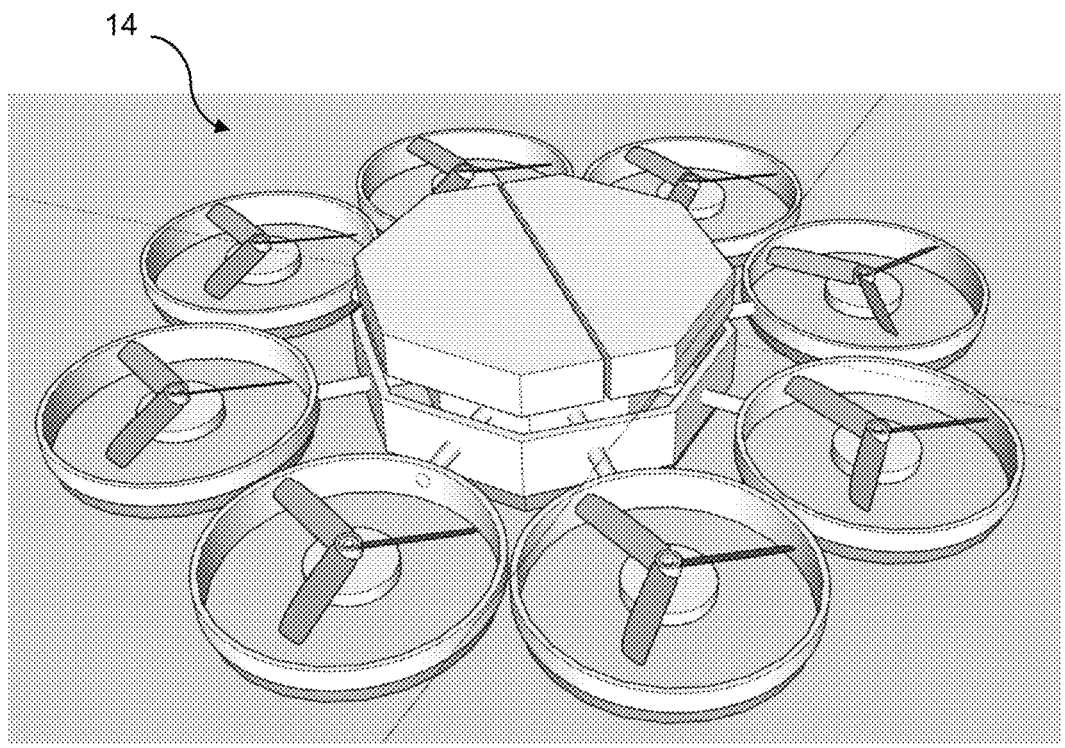
FIG. 1C is an enlarged perspective view of an exemplary embodiment of a single drone designed to be used in scale in accordance with presently disclosed subject matter.

The use of a swarm of semi-autonomous fire-fighting drones affords a continuous operational tempo with each sortie able to deliver thousands of times the amount of retardant as conventional vehicles while costing $\frac{1}{10}$ to $\frac{1}{100}$ of the cost. FIG. 1A illustrates the presently disclosed concept of a large number of drones generally 10 each carrying substantial amounts of fire retardant in route to a fire or drop zone, or carrying other material to be delivered. FIG. 1B represents an embodiment of a swarm generally 12 of semi-autonomous drones, such as for firefighting or load delivery in other alternative contexts, in accordance with presently disclosed subject matter. FIG. 1C is an enlarged perspective view of an exemplary embodiment of a single drone generally 14 designed to be used in scale in accordance with presently disclosed subject matter.

Exemplary embodiments of presently disclosed drone body features include main stress frame features. In particular, in some embodiments, the drone body generally 16 (FIG. 2) is designed to be modular so different components can be attached with ease and with no special training or knowledge required. Since the drone is expected to lift and carry several hundred pounds suspended beneath it, the main component may preferably be a "stress frame" strong enough to support hundreds of pounds of weight yet allow easy attachment of rotor nacelles, power modules, and cargo fixtures.

Figure 2:
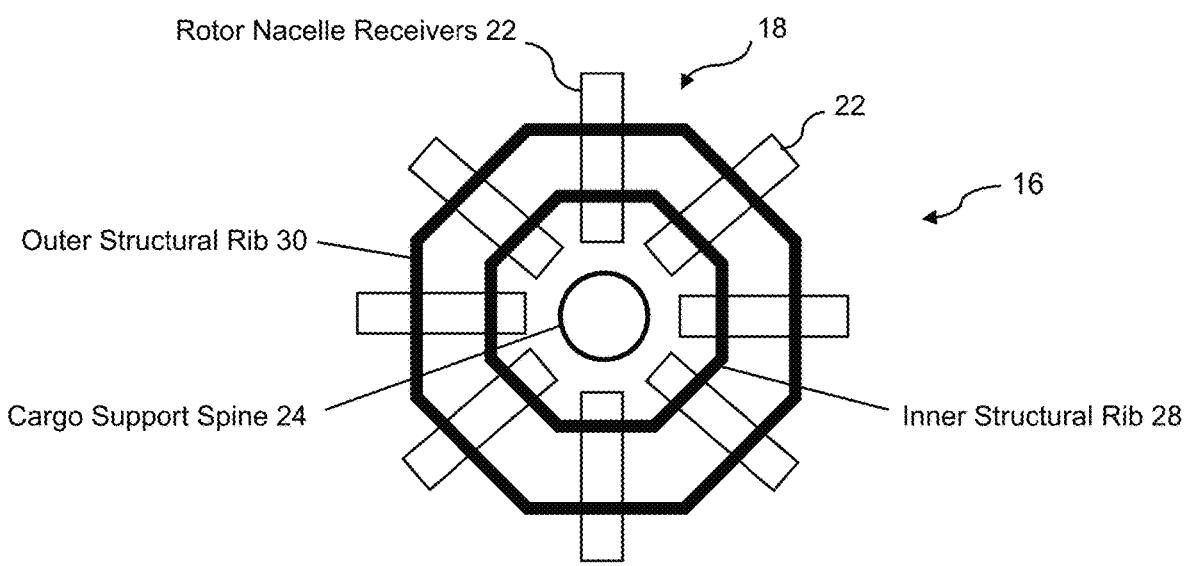
FIG. 2 illustrates a top plan view of an exemplary embodiment of a main or basic stress frame of a modular drone body in accordance with presently disclosed subject matter.
Figure 3:
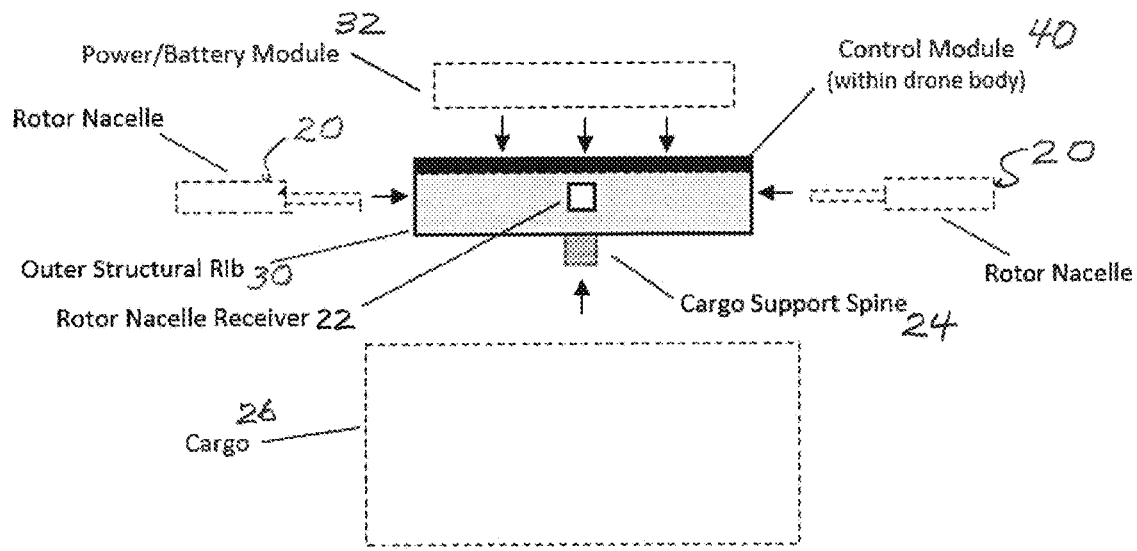
FIG. 3 illustrates a side plan view (partially exploded) of an exemplary embodiment of a main or basic stress frame of a modular drone body in accordance with presently disclosed subject matter.

FIG. 2 illustrates a top plan view of an exemplary embodiment of a main or basic stress frame generally 18 of a modular drone body 16 exemplary embodiment in accordance with presently disclosed subject matter. FIG. 3 illustrates a side plan view (partially exploded) of an exemplary embodiment of a main or basic stress frame generally 18 of a modular drone body 16 in accordance with presently disclosed subject matter.

As shown in FIG. 3, rotor nacelles 22 may be attached to the side of the drone body 16 by inserting them into one of the rotor nacelle receivers generally 22. Cargo generally 26 is attached to the cargo support spine generally 24 on an underside of the drone. The cargo support spine 24 translates the weight of the cargo being carried up and through the main stress frame 18. Such frame 18 in turn includes members inner structural rib generally 28 and outer structural rib generally 30. Thrust provided by the rotor propellers counteract the weight of the cargo 26 and is translated to the main stress frame 18 via the rotor nacelle receivers 22. A power module or modular batteries generally 32 are attached to the top of the drone. The power module/modular battery 32 supplies electrical power to the power regulator 34 (FIG. 4) which distributes electrical power to units within the drone including the rotor nacelles 22.

Figure 4:
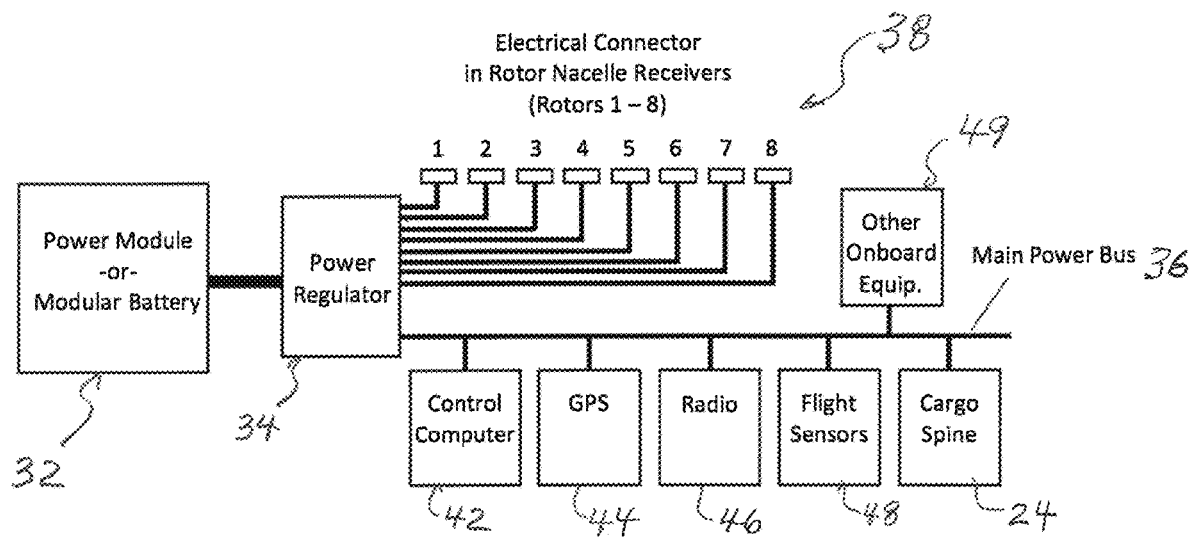
FIG. 4 illustrates a schematic plan view of an exemplary embodiment of main power bus distribution features and rotor nacelle power distribution features of a modular drone in accordance with presently disclosed subject matter.

Exemplary power bus and power distribution features are represented by present FIG. 4, which illustrates a schematic plan view of an exemplary embodiment of main power bus generally 36 and rotor nacelle power distribution features generally 38 of a modular drone in accordance with presently disclosed subject matter. Electrical power is distributed throughout the drone (including to its internal and/or associated components and/or modules) via an electrical common power bus 36 from a power regulator module 34. Electrical power is generated by a power module 32 or is drawn from one or more electrical modular batteries attached to the top of the drone. Electrical power is regulated by a power conditioner or regulator and then carried to other elements by the power bus. FIGS. 3 and 4 show a schematic of control module generally 40 carried within the drone body and its relationship to other modules therein. In particular, as schematically represented, a drone may be operated (as well understood by those of ordinary skill in the art) through use of onboard control computer 42, GPS 44, radio 46, and flight sensors 48, with power thereto provided by power bus 36. Power bus 36 also provides or supplies power to any cargo module connected to cargo spine 24, as represented by FIG. 4. As also represented by FIG. 4, power bus 36 may supply power to any other onboard equipment (generally 49) which may include such as cameras, additional specific sensors, lights, and similar adjunct features.

The presently disclosed subject matter herein described is of a drone design allowing rotors to be easily attached and detached (plug-and-play style) from the drone body. Mechanical and electrical fixtures allow the rotor nacelle to be easily attached and detached. When attached, the electrical connection allows electrical power and control signals to reach the rotor, the rotor's motor system, and any control hardware associated with the rotor nacelle.

Figure 5:
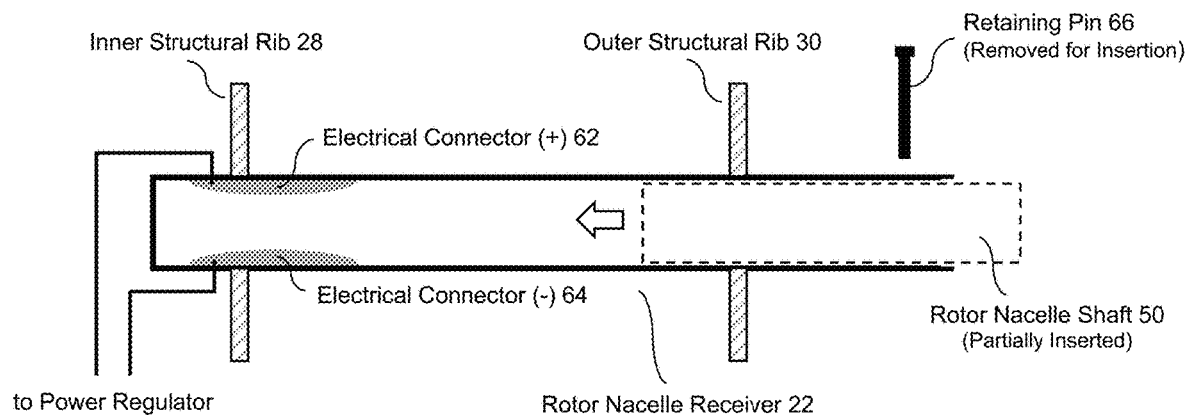
FIG. 5 illustrates a schematic side view of an exemplary embodiment of rotor nacelle receiver features of a modular drone in accordance with presently disclosed subject matter.
Figure 6:
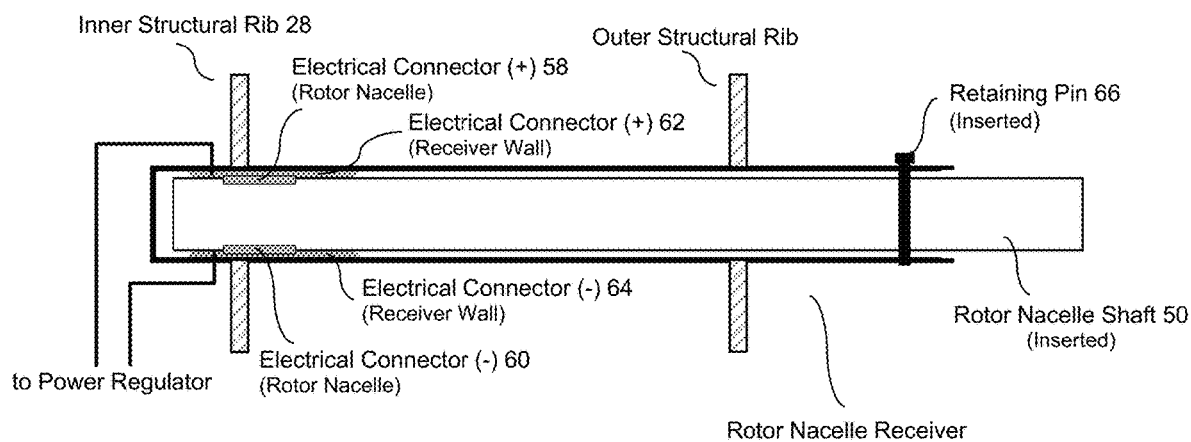
FIG. 6 illustrates a schematic side view similar to FIG. 5 of an exemplary embodiment of rotor nacelle receiver features of a modular drone in accordance with presently disclosed subject matter, with illustration of inserted rotor nacelle shaft features.
Figure 7:
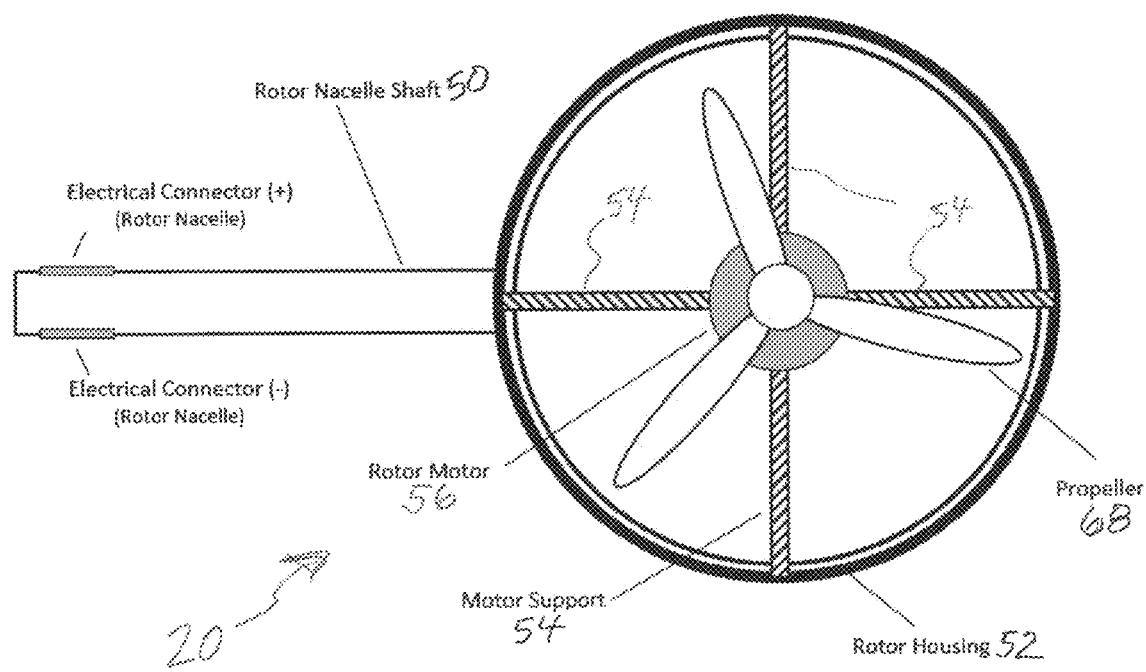
FIG. 7 illustrates a schematic top view of an exemplary embodiment of rotor nacelle receiver features of a modular drone in accordance with presently disclosed subject matter as in FIGS. 5 and 6, with illustration of inserted rotor nacelle shaft features attached to a rotor housing.
Figures 8A, 8B, 8C, 8D:
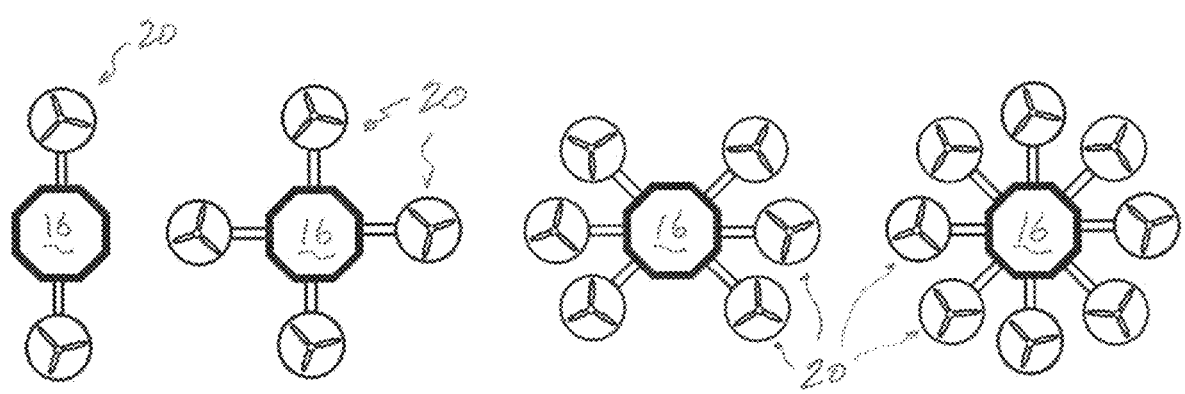
FIGS. 8A through 8D illustrate, respectively, top plan views of an exemplary embodiment of a modular drone in accordance with presently disclosed subject matter, having eight (8) rotor nacelle receivers, and having respective two (2), four (4), six (6), and eight (8) rotor configurations.

FIG. 5 illustrates a schematic side view of an exemplary embodiment of rotor nacelle receiver features of a modular drone in accordance with presently disclosed subject matter. FIG. 6 illustrates a schematic side view similar to FIG. 5 of an exemplary embodiment of rotor nacelle receiver features of a modular drone in accordance with presently disclosed subject matter, with illustration of inserted rotor nacelle shaft features. Further, FIG. 7 illustrates a schematic top view of an exemplary embodiment of rotor nacelle receiver features of a modular drone in accordance with presently disclosed subject matter as in FIGS. 5 and 6, with illustration of inserted rotor nacelle shaft features attached to a rotor housing.

The ability to easily attach rotor nacelles also allows different kinds of rotors to be fitted to the drone depending on mission requirements. This capability is also useful in research and development of new rotor designs. Furthermore, modular rotor nacelles allow the drone to take advantage of newly emerging rotor technology. New rotor designs can be simply attached rather than a re-design and re-building of the entire drone as current drones require. Also, this modular rotor feature means that the presently disclosed subject matter allows a user to configure lift capacity and power consumption to match task and mission.

The presently disclosed subject matter described herein allows drones to be fitted with the number and type of rotors needed for a specific mission. Different missions require rotors with certain performance characteristics matching the mission's challenges. The ability to easily attach rotor nacelles allows the drone to be configured for the mission.

Virtually any application using drones can benefit from the presently disclosed subject matter described herein. Employing the presently disclosed subject matter described herein facilitates the development of a universal drone design able to be configured for different missions and applications by simply attaching the appropriate number and type of rotor nacelles required for the mission. Such drones are currently employed in construction, delivery, cleaning, and maintenance applications.

Drones use rotors to generate upward and forward thrust needed to maintain flight. Current drones are designed to have multiple rotors, but the number of rotors is fixed. Often, the mission does not require all rotors, yet the fixed design requires the drone to carry the unnecessary rotors anyway. Other missions require extended lift capability facilitated by additional rotors, but fixed designs do not permit the drone to be configured with additional rotors. The presently disclosed subject matter herein described is of a drone design allowing rotors to be easily attached and detached from the drone body.

The rotor nacelle, shown in FIG. 7, consists of a rotor nacelle shaft generally 50 attached to a rotor housing 52. Within the rotor housing 52, a plurality of motor supports 54 hold the rotor motor 56 in place. The rotor motor 56 is powered by electrical current supplied by the power regulator through electrical connectors on the rotor nacelle shaft 50 in contact with electrical connectors on the rotor nacelle receiver as shown in FIGS. 6 and 7.

The rotor nacelle 20 is attached to the drone body 16 by inserting the rotor nacelle shaft 50 into the rotor nacelle receiver 22. When fully inserted, as shown in FIG. 6, electrical connectors 58 and 60, respectively, (+ and −) on the rotor nacelle shaft 50 make contact with electrical connectors 62 and 64, respectively, (+ and −) on the rotor nacelle receiver 22. Once inserted, a retaining pin or similar or equivalent 66 is inserted through holes in the rotor nacelle receiver 22 and the rotor nacelle shaft 50. The rotor nacelle 20 is detached from the drone body 16 by removing the retaining pin 66 and pulling the rotor nacelle 20 outward until the rotor nacelle shaft 50 exits the rotor nacelle receiver 22.

The ability to quickly detach and attach rotor nacelles 20 is critical in drone swarm applications such as firefighting. Because the drones operate in a hostile environment (wildfires), damage to the rotor nacelle is to be expected. A number of spare rotor nacelles may be kept on hand so if damage does occur, a person can quickly detach the damage rotor nacelle and attach a new rotor nacelle. Furthermore, because of the plug-and-play nature of the rotor nacelles, the person performing the exchange of rotor nacelles needs no special training or knowledge. This is necessary when swarms of thousands of these drones are in use so only a minimal number of people will be needed to maintain the entire swarm.

The ability to easily attach rotor nacelles also allows different kinds of rotors to be fitted to the drone depending on mission requirements. This capability is also useful in research and development of new rotor designs. Furthermore, modular rotor nacelles allow the drone to take advantage of newly emerging rotor technology. New rotor designs can be simply attached rather than a re-design and re-building of the entire drone as current drones require.

Easily attached/detached rotor nacelles 20 make it possible to configure a drone for different missions to accommodate for increased range and/or lift capacity. More rotors and/or more cargo weight results in faster battery drain. Each drone may have up to eight (8) rotor nacelle receivers. Any number of rotor nacelles can be attached as needed. Two (2), four (4), six (6), and eight (8) rotor configurations are shown, respectively, in FIGS. 8A through 8D. Those figures illustrate, respectively, top plan views of an exemplary embodiment of a modular drone in accordance with presently disclosed subject matter, having eight (8) rotor nacelle receivers, and having respective two (2), four (4), six (6), and eight (8) rotor configurations. As seen in FIG. 7, each rotor nacelle 20 in turn may have a propeller generally 68 having a plurality of respective blades, for example, three blades.

The presently disclosed subject matter herein described is of a drone design allowing wings to be easily attached and detached as desired due to the modular wing attachment nature of the subject matter. Wings are not needed for some missions while for other missions, wings provide important performance enhancements. The presently disclosed subject matter herein described allows the drone to be configures as needed to meet mission objectives.

One performance enhancement provided when using wings is flight time extension. Conventional drones using rotating rotors and no wings continually consume power, usually electrical power supplied by batteries, and therefore, have limited time in the air. However, using wings, the drone can soar, like a bird, using the lift generated by airflow over the wings. Therefore, the drone could use rotors to gain altitude, then power down the rotors and glide forward as the drone descends to gain distance down range. Wings also allow drones to take advantage of uplifts, like a glider, which could also greatly extend the distance a drone could fly. Extended range could be important in transportation missions where the drone itself or cargo carried by the drone needs to travel a significant distance from the launch point.

Virtually any drone can benefit from the presently disclosed subject matter described herein. Employing the presently disclosed subject matter described herein facilitates the development of a universal drone design able to be configured for different missions and applications by simply attaching the wings. Such drones would be useful in delivery, fire-fighting, emergency response, and material supply applications.

Existing drones either use rotors and are not able to also attach wings or they use wings which cannot be detached. Meanwhile, the presently disclosed subject matter herein described allows the drone to be configured easily by simply plugging in wings if needed to meet mission objectives.

Figure 9A:
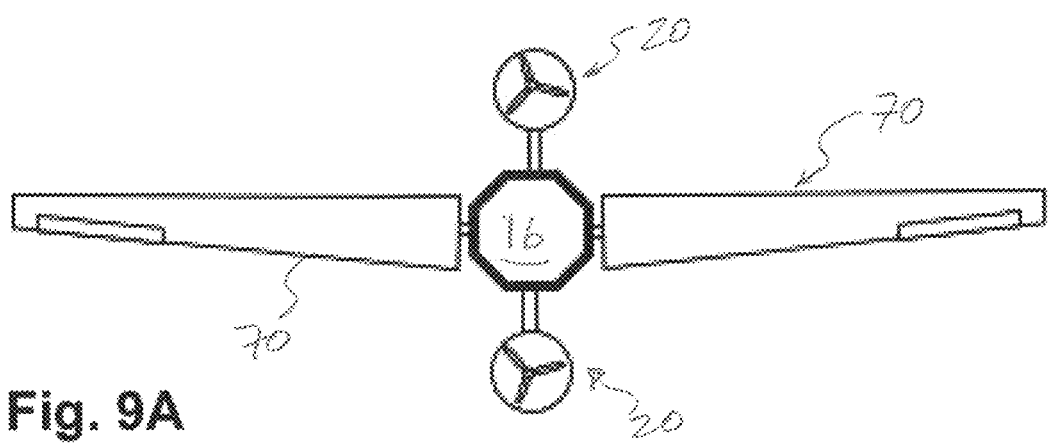
FIGS. 9A through 9C illustrate, respectively, top plan views of an exemplary embodiment of a modular drone in accordance with presently disclosed subject matter, having eight (8) rotor nacelle receivers, two of which are fitted with a modular wing attachment each, and having respective two (2), four (4), and six (6) rotor configurations.
Figure 9B:
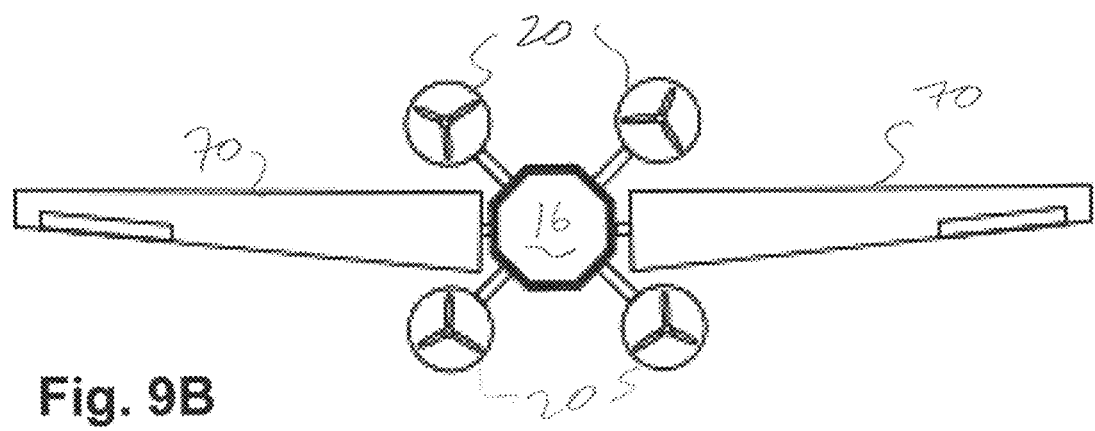
Figure 9C:
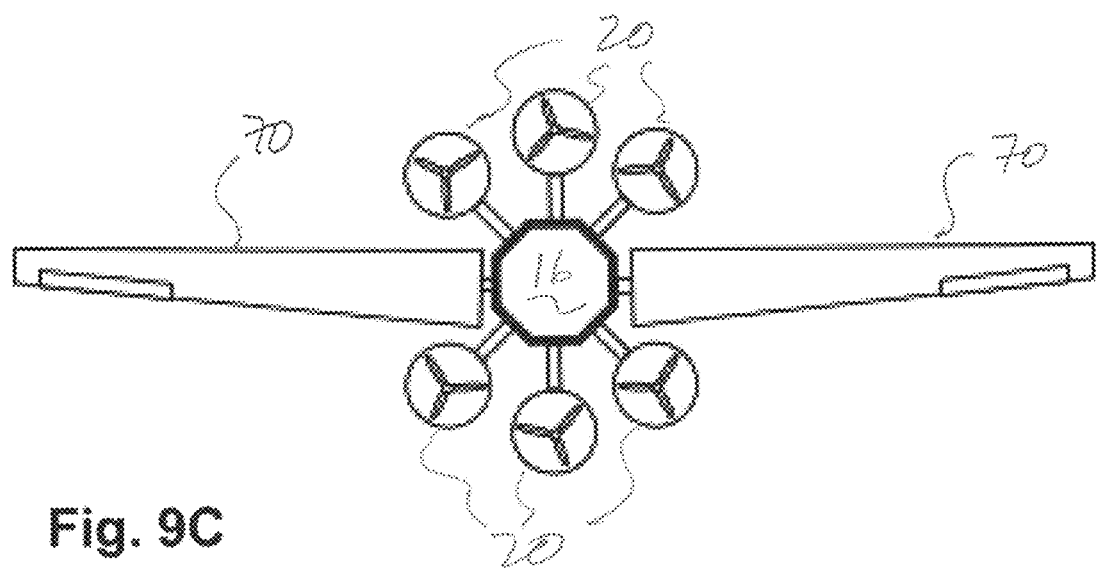

Components other than rotor nacelles may be attached to the drone via the rotor nacelle receivers. An example is a plurality of modular wing attachments. A modular wing attachment as presently disclosed is an airfoil fitted with a rotor nacelle shaft allowing it to be plugged into the drone body as shown in FIGS. 9A through 9C. In particular, FIGS. 9A through 9C illustrate, respectively, top plan views of an exemplary embodiment of a modular drone (body 16) in accordance with presently disclosed subject matter, having eight (8) rotor nacelle receivers, two of which are fitted with a modular wing attachment 70 each, and having respective two (2), four (4), and six (6) rotor configurations (rotor nacelles 20).

Figure 10A:
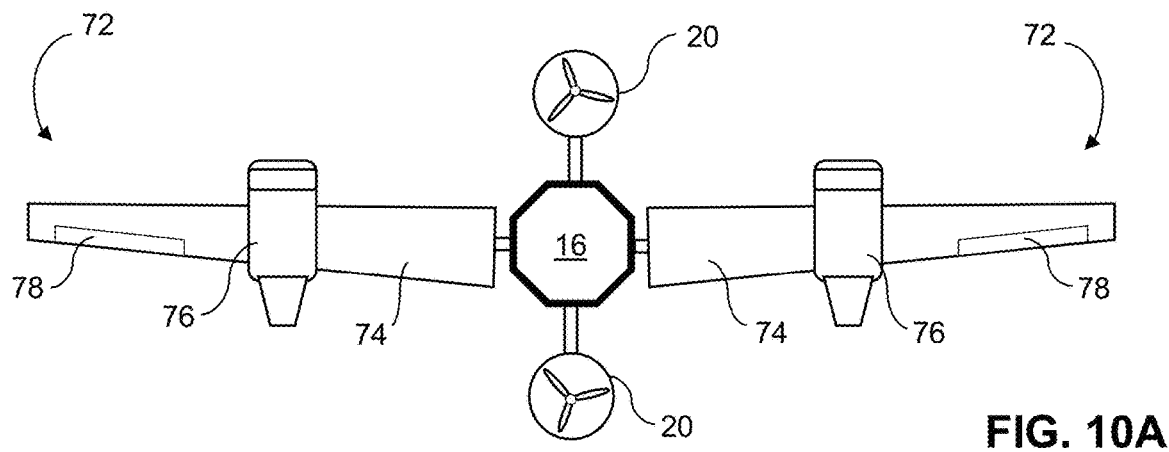
FIGS. 10A through 10C illustrate, respectively, top plan views of an exemplary embodiment of a modular drone in accordance with presently disclosed subject matter, having eight (8) rotor nacelle receivers, two of which are fitted with a modular combination wing and engine attachment each, and having respective two (2), four (4), and six (6) rotor configurations.
Figure 10B:
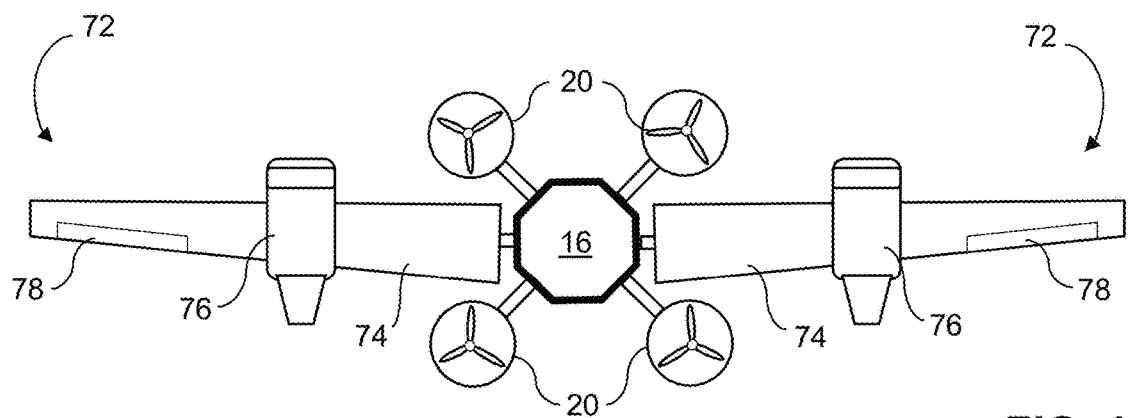
Figure 10C:
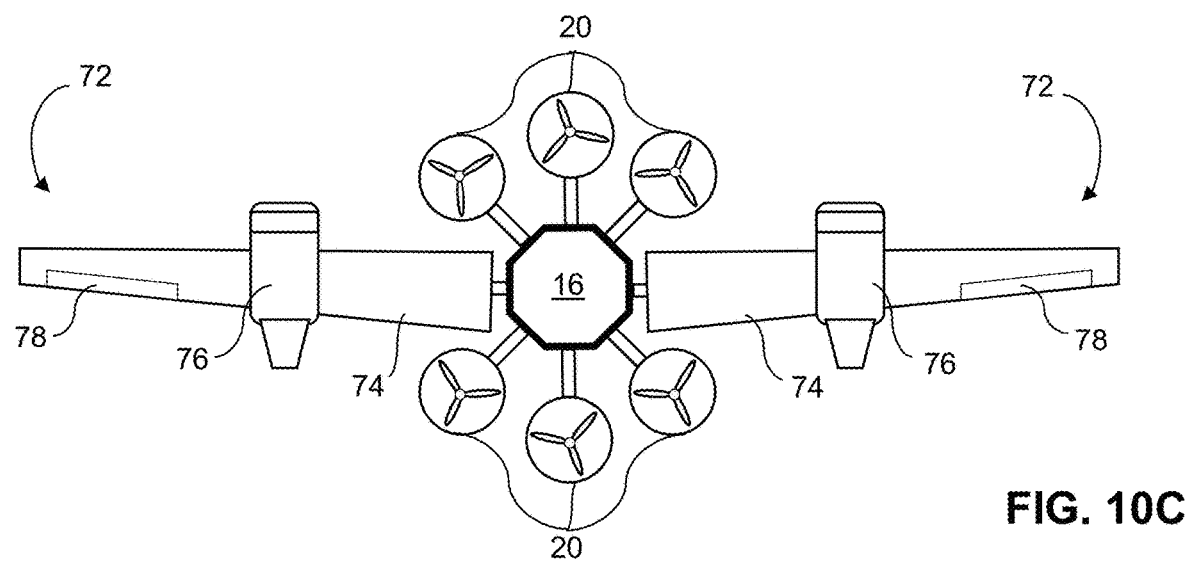

Instead of only a glider wing for soaring as described herein, presently disclosed modular engine/wing attachments can be attached also as represented in FIGS. 10A through 10C. In particular, FIGS. 10A through 10C illustrate, respectively, top plan views of an exemplary embodiment of a modular drone (body 16) in accordance with presently disclosed subject matter, having eight (8) rotor nacelle receivers, two of which are fitted with a modular combination wing and engine attachment 72 each, and having respective two (2), four (4), and six (6) rotor configurations (rotor nacelles 20). Each combination wing and engine attachment 72 may have wing features generally 74 and wing-mounted engine features 76, as represented. As further represented, wing features (FIGS. 9A through 9C) or wing/engine combination features (FIGS. 10A through 10C) as presently disclosed may have movable wing control surfaces generally 78, as will be understood by those of ordinary skill in the art without detailed additional explanation.

A primary reason for this type of attachment is long-range transport. These types of attachments transfer the drone into a more traditional airframe. Traditional propeller or small jet engines could serve to transport the drone thousands of miles. This is important to be able to respond to distant locations (e.g., a wildfire) from a base of operations (e.g., an airbase). Once the drone has arrived, the wing attachments can be replaced with rotor nacelles for local operation, as needed for addressing a local mission.

The presently disclosed subject matter described herein involves a drone design able to accept a power module of virtually any technology (e.g., battery, fuel cell, internal combustion, turbine, etc.) in a plug-and-play fashion. In other words, some aspects of presently disclosed subject matter for some presently disclosed exemplary embodiments relate to the use of exchangeable drone power modules. The power module, no matter what the technology used within, supplies electrical power to a common power bus generally 36 (see FIG. 4). Modular power modules implemented in this manner allows one to choose the appropriate power technology for the mission and allows one to quickly swap out power modules for a fresh power module of the same type or for a power module of a different type.

Virtually any application using drones powered by an on-board power module and designed for a specific application or mission can benefit from the presently disclosed subject matter described herein. Different power module types are useful for some applications and not for others. Existing drones use one type of power module so that exchanging it for a power module of a different type is not possible. Employing the presently disclosed subject matter described herein facilitates the development of a universal drone design able to be configured for different missions and applications by simply attaching the appropriate power module.

Often with drones, the power source must be changed often and replaced with a fresh power module. Using the presently disclosed subject matter herein described would allow extremely quick, and even autonomous, swapping of power modules. Currently, drones are custom designed or configured for specific missions but, once so configured, are difficult to change, especially relating to the power modules.

Described herein, modular batteries are envisioned to supply the electrical power to the drone. However, electrical storage batteries are not the only power source available. Thus, the drone is able to accept virtually any kind of power module capable of delivering electrical power to the power regulator for distribution to elements in the drone. Examples of other types of power modules include fuel-burning electrical generators, hydrogen fuel cells, hybrid fuel cells, alcohol turbines, gasoline, etc. In addition, configurable single mode or mixed-mode power is possible using, e.g., both battery and gasoline powered. Power sources, such as battery packs, may be top-mounted for ease of removal and/or replacement. Such a power pack per presently disclosed subject matter may supply a common electrical power bus for powering the entire drone, where, for example, the rotors are electric.

Figure 11:
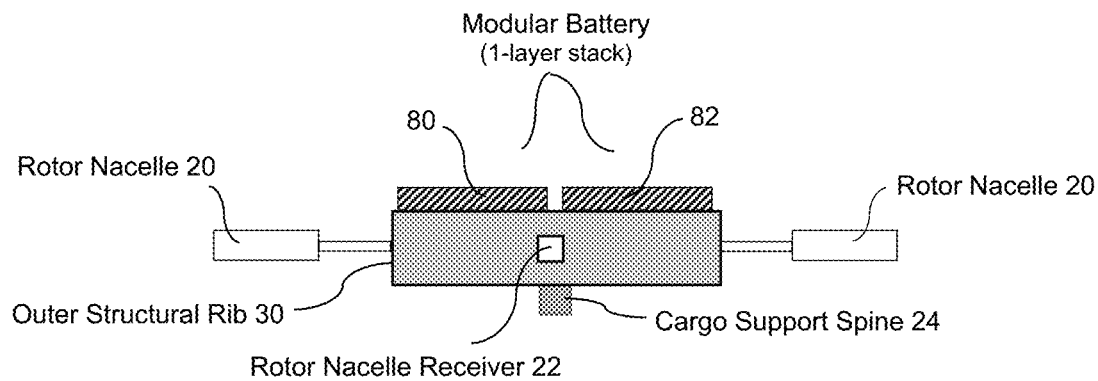
FIG. 11 illustrates a side elevation plan view of an exemplary embodiment of a modular drone device in accordance with presently disclosed subject matter, and electrically connected with a pair of added battery modules.

FIG. 11 illustrates a side elevation plan view of an exemplary embodiment of a modular drone device in accordance with presently disclosed subject matter, and electrically connected with a pair of added battery modules generally 80 and 82.

An alternative modular power module as presently disclosed replaces the exemplary modular battery shown herein. Therefore, the alternative power module must be able to be attached to the top of the stress frame and not overhang in a way which would otherwise interfere with the airflow through the rotor nacelles 20. Any fuel required for the alternative power module must be contained within the power module or carried below the drone as cargo. The output of the alternative power module is plugged into the power regulator.

The presently disclosed subject matter described herein also involves modular, externally-mounted battery modules allowing additional battery modules to be added in a stackable fashion. The presently disclosed subject matter described herein involves stackable battery modules allowing batteries to be added as desired to increase the total amount of electrical energy available to the drone. When mounted, each added battery module becomes electrically connected in parallel to the other batteries, thereby increasing the total amount of electrical energy available to the drone. Operational time and range of battery-powered drones is limited by the lifetime of the charge in the batteries. The presently disclosed subject matter described herein is valuable in any application requiring extended time or range. Using the presently disclosed subject matter described herein, batteries can be easily added to extend operational time and range as desired.

Figure 12:
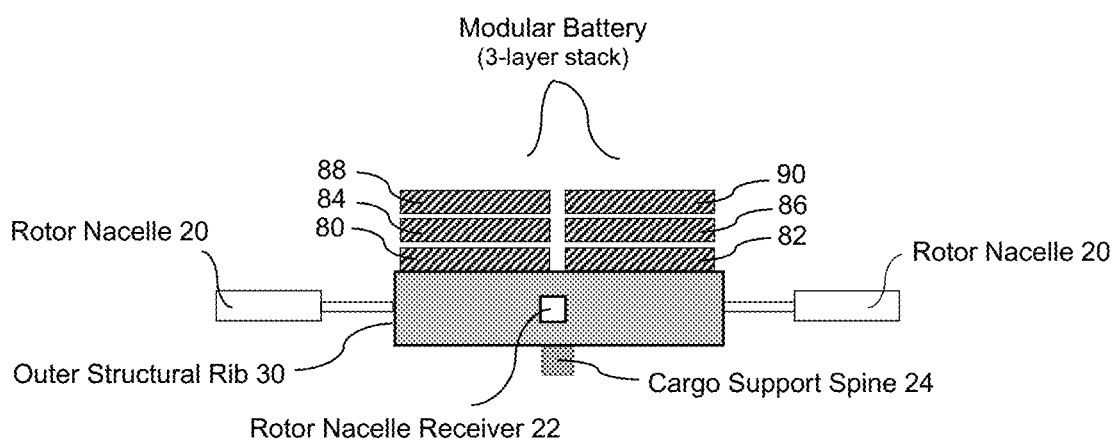
FIG. 12 illustrates a side elevation plan view of an exemplary embodiment of a modular drone device in accordance with presently disclosed subject matter, and electrically connected with a pair of triple-stacked added battery modules.

FIG. 12 illustrates a side elevation plan view of an exemplary embodiment of a modular drone device in accordance with presently disclosed subject matter, and electrically connected with a pair of triple-stacked added battery modules, including modules 80, 82, 84, 86, 88, and 90.

Any drone could benefit from the presently disclosed subject matter herein disclosed because the operational time and range of every battery-powered drone is limited by the lifetime of the batteries. Certainly, adding batteries in the manner described herein adds weight. Many existing drones do not have the weight lifting capacity to support very many additional battery modules. However, the class of heavy-lift drones capable of lifting tens to thousands of pounds can readily support multiple battery modules added in the manner herein described. Existing markets for this subject matter (e.g., construction, inspection, and cleaning/servicing industries) would otherwise be severely limited by the lifetime of the batteries. The presently disclosed subject matter described herein would greatly extend the operational time and range of drones. An important benchmark would be to extend operational life of a drone to span an entire 8- to 12-hour work shift.

Operational time of battery-powered drones is limited by the lifetime of the charge in the batteries. Adding batteries to the drone would extend operational time, but existing drones have batteries encapsulated within the body or framework of the drone making it difficult to add batteries. The presently disclosed subject matter described herein involves modular, externally-mounted battery modules allowing additional battery modules to be added in a stackable fashion. When mounted, each added battery module—whether in lateral pairs and/or stacked—becomes electrically connected in electrically parallel with the other batteries (as represented in present FIGS. 11 and 12), thereby increasing the total amount of electrical energy available to the drone.

Each modular battery is designed to mate with another modular battery. A male module coupler on the top of one modular battery slides into a corresponding female module coupler on the bottom of the modular battery, as shown in various present figures.

Figure 13:
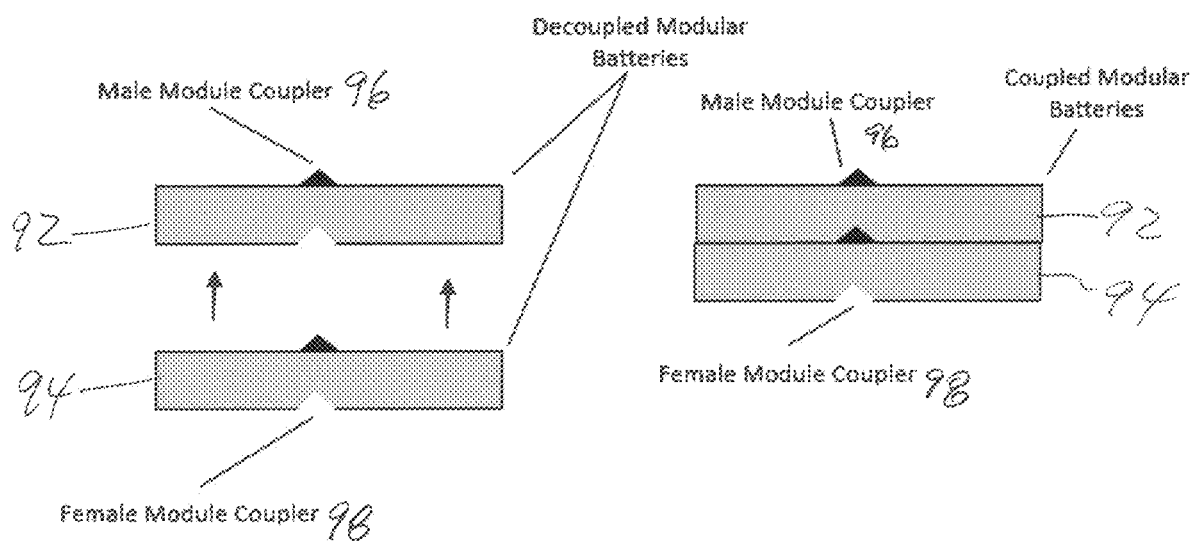
FIG. 13 illustrates in side elevation view a respective representative pair of decoupled and coupled, respectively, modular batteries with respective male module and female module coupler features.
Figure 14:
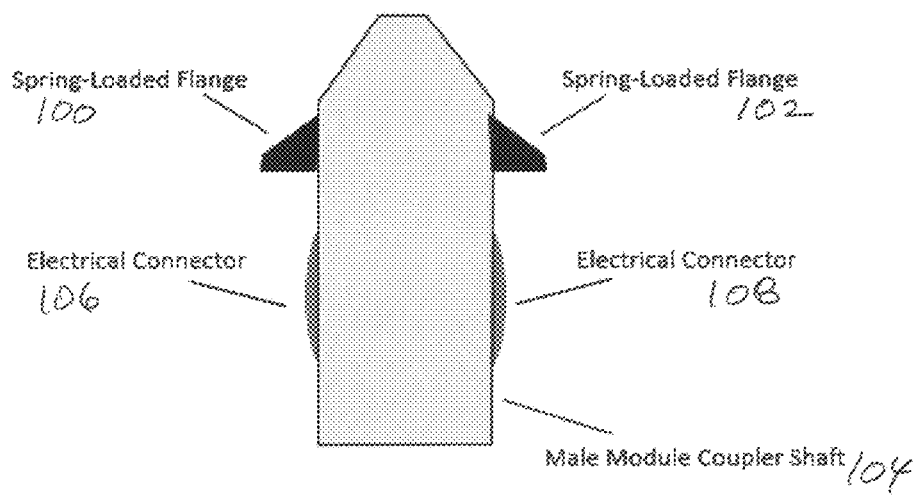
FIG. 14 illustrates in side elevation view additional details of an exemplary a male modular coupler feature, as incorporated into the FIG. 13 embodiment thereof.

FIG. 13 illustrates in side elevation view a respective representative pair of decoupled and coupled, respectively, modular batteries 92 and 94, each with diagrammatic representation of respective male module and female module coupler features 96 and 98, respectively. FIG. 14 illustrates in side elevation view additional details of a generally exemplary a male modular coupler feature 96, as incorporated into the FIG. 13 embodiment thereof. Such details may include, for example, a pair of spring-loaded flanges 100 and 102 near a distal end of a male module coupler shaft generally 104. Respective electrical connectors or contacts 106 and 108 may likewise be provided along shaft 104.

Figure 15:
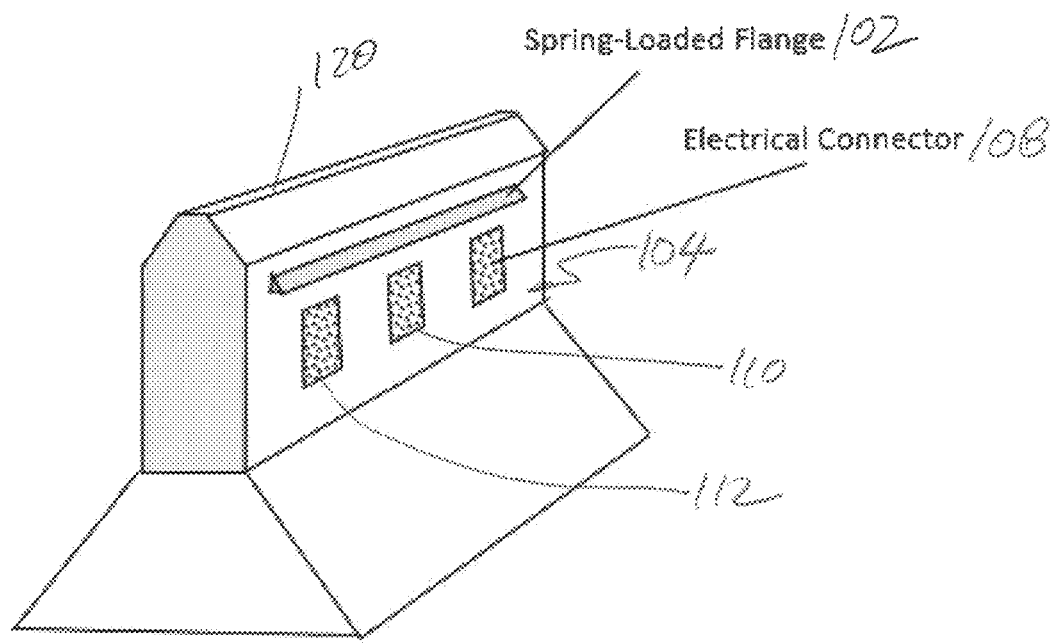
FIG. 15 illustrates a general perspective view of additional details of an exemplary embodiment in accordance with presently disclosed subject matter of a male module coupler feature, as incorporated into the FIGS. 13 and 14 embodiment thereof.

FIG. 15 illustrates a generally perspective view of additional details of an exemplary embodiment in accordance with presently disclosed subject matter of a male module coupler feature generally 96, as incorporated into the FIGS. 13 and 14 embodiments thereof. For example, the shape of shaft 104 is actually generally elongated in one width direction, with a corresponding width increase in the representative flange 102. Electrical connector or contact 108 in some embodiments may be made into plural, electrically connected elements 108, 110, and 112, all supported on shaft feature 103, as represented.

As represented, the exemplary male/female module coupler in accordance with presently disclosed subject matter provides a mechanical connection holding the modules together physically and also an electrical connection connecting the two modular batteries in parallel (+ to + and − to −).

The male module coupler is a protruding structure as shown in FIG. 15. The female module coupler is a recessed cavity. The sides of both the male and female module coupler are slanted to facilitate self-alignment during the coupling process. Any slight misalignment will be corrected when the male module coupler strikes the slanted walls of the female module coupler. The self-alignment nature also insures proper alignment of the respective electrical connectors.

Figure 16:
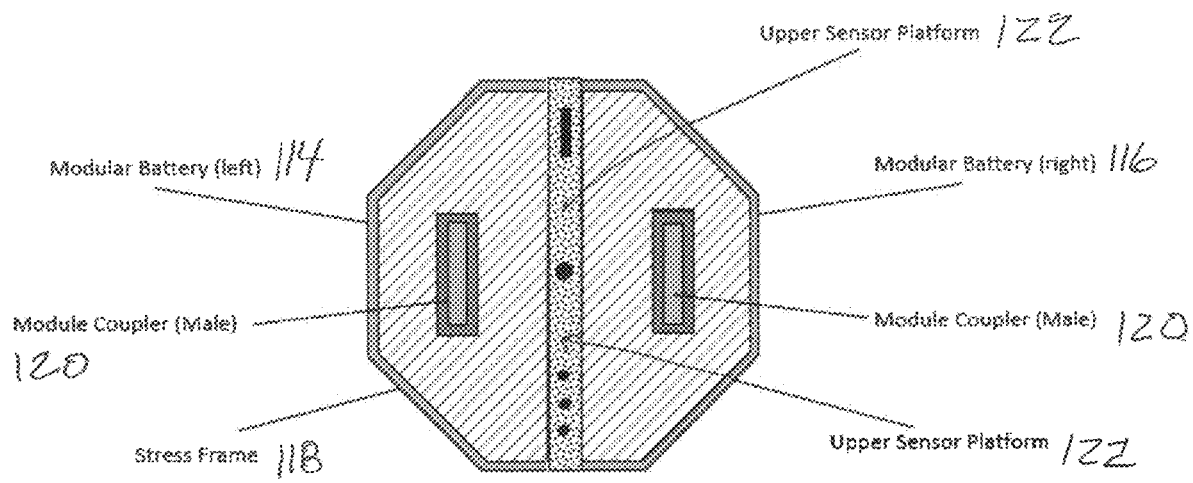
FIG. 16 illustrates a top plan view of an exemplary embodiment in accordance with presently disclosed subject matter of two modular batteries attached to the top of an exemplary stress frame embodiment of presently disclosed subject matter.

In one exemplary embodiment, two modular batteries attach to the top of the stress frame, as shown in FIG. 16. The shape shown in the example is octagonal to ensure clearance of the rotor nacelles for maximal airflow. However, the shape of the module batteries can be any shape as long as it does not extrude too far past the edge of the stress frame, as also shown in FIG. 17.

In particular, FIG. 16 illustrates a top plan view of an exemplary embodiment in accordance with presently disclosed subject matter of two modular batteries 114 and 116 attached to the top of an exemplary stress frame 118 embodiment of presently disclosed subject matter. An upper edge 120 (see also FIG. 15) of each male module coupler is also visible through openings in an upper surface in the top plan view of FIG. 16. Such upper surface may also form an upper sensor platform generally 122, as otherwise referenced herein.

Figure 17:
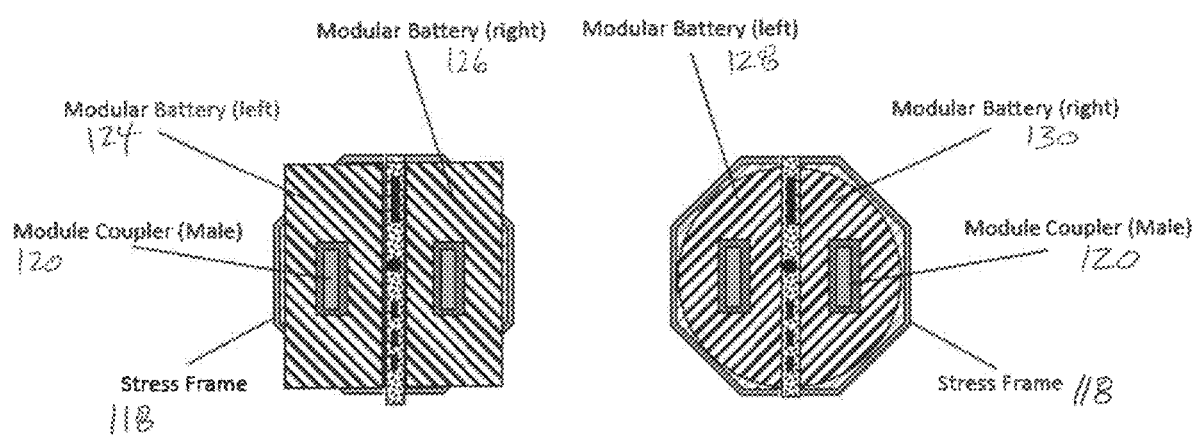
FIG. 17 illustrates a top plan view of alternative exemplary embodiments in accordance with presently disclosed subject matter of shapes for two modular batteries attached to the top of an exemplary stress frame embodiment of presently disclosed subject matter.

FIG. 17 illustrates a top plan view of alternative exemplary embodiments in accordance with presently disclosed subject matter of shapes for two modular batteries attached to the top of an exemplary stress frame embodiment of presently disclosed subject matter. In one of the represented embodiments, a pair of modular batteries 126 and 126 are generally rectangular in cross-sectional shape, while in the other represented embodiment, the pair of modular batteries are generally semi-circular in cross-sectional shape, as illustrated.

Another feature of some embodiments of presently disclosed subject matter relates in pertinent part to autonomous hot-swappable drone batteries. Operational time of battery-powered drones is limited by the lifetime of the charge in the batteries. To operate over extended periods of times, drones must swap spent batteries for freshly-charged batteries. Existing drones require significant time and effort to accomplish a battery swap. The presently disclosed subject matter described herein is valuable in any application benefitting from minimal human intervention for battery swapping. Human time and effort are especially critical in the operation of large swarms of drones consisting of hundreds to thousands of drones. In applications employing large swarms, tens of thousands of battery swaps per hour may be required resulting in thousands of person-hours of effort required per hour of operation of the swarm. Employing the presently disclosed subject matter described herein, human effort for battery swaps for large swarms is eliminated.

Figure 18A:
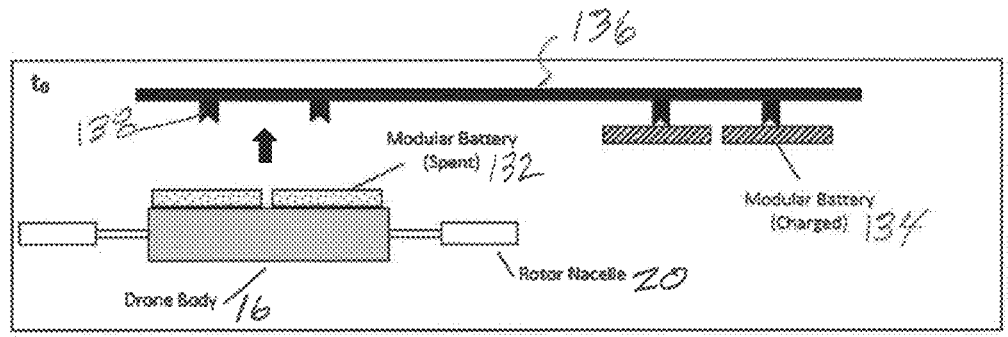
FIGS. 18A through 18D, respectively, represent steps (with schematic device side view illustrations) in an exemplary embodiment of presently disclosed methodology and corresponding device subject matter, by which an autonomous modular battery swap for drones may take place per presently disclosed subject matter.
Figure 18B:
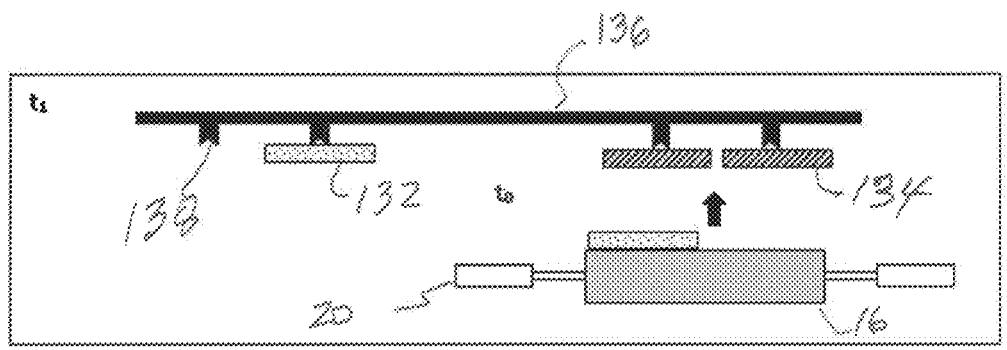
Figure 18C:
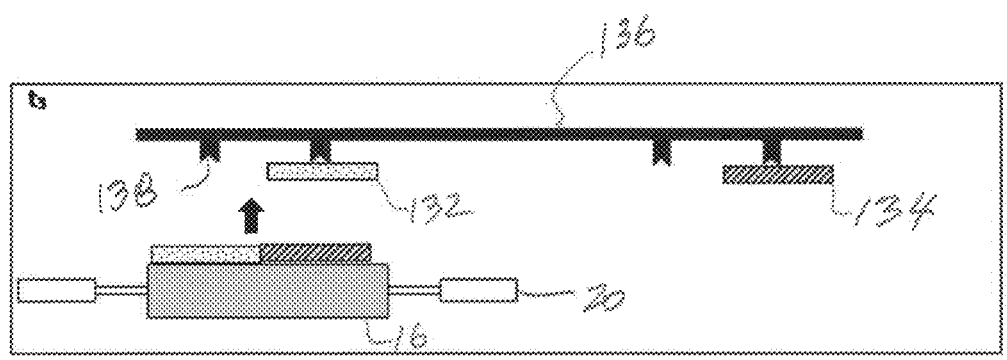
Figure 18D:
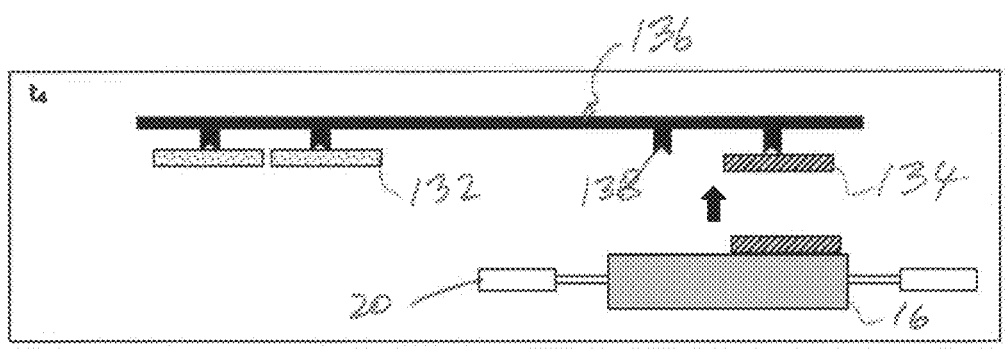

FIGS. 18A through 18D, respectively, represent steps (with schematic device side view illustrations) in an exemplary embodiment of presently disclosed methodology and corresponding device subject matter, by which an autonomous modular battery swap for drones may take place per presently disclosed subject matter. In particular, in FIG. 18A, the drone is maneuvered into position below a support member 136 having a pair of vacant docking elements 138. An adjacent pair of docking elements support a pair of charged modular batteries 134. The drone deposits one of its spent modular batteries 132 onto a docking element 138, and then moves beneath a charged or fresh modular battery 134, as represented by FIG. 18B. After obtaining a fresh or charged modular battery 134 (or other form of modular power supply as otherwise described herein), the drone moves back into position to deposit another spent battery 132, as represented by FIG. 18C. Finally, as represented by FIG. 18D, the drone moves onto to obtain another fresh battery module 134.

All functionality on the drone can be powered by one battery module, meaning all other battery modules can be removed without impairing operation (even though the duration of operation is obviously limited). As represented by FIGS. 18A through 18D, to change its own batteries, the drone navigates to and performs a rendezvous with a charging station containing charged batteries. The charged batteries may be located on a fixed or mobile ground-based or airborne platform. Each battery module contains a fixture that mates with a corresponding fixture on the charging station allowing battery modules to be attached and detached from the station.

The steps represented by FIGS. 18A through 18D represent completing an autonomous battery swap. For drones containing more than two battery modules, the above process is repeated until all modules are exchanged.

Any drone could benefit from the presently disclosed subject matter. However, the swarm-based drone market could particularly benefit because of the practical problems associated with operating thousands of drones at the same time in a theater of operation. Future markets may include, for example, fire-fighting, emergency response, and material supply/logistics.

The swarm-based drone market is just beginning to come into being. With operational time of battery-powered drones limited by the lifetime of the charge in the batteries and to operate over extended periods of times or in large numbers, drones must swap spent batteries for freshly-charged batteries. Existing drones require significant time and effort to accomplish a battery swap. Employing the presently disclosed subject matter described herein, human effort for battery swaps for large swarms is potentially eliminated.

When engaging thousands of drones in a swarm, autonomy is of utmost value. It will be impractical to have hundreds or thousands of people on-hand to service a swarm of drones as existing drone design would require. To facilitate fully autonomous operation, the drones must be able to exchange spent batteries with charged batteries without human interaction. In existing drones, batteries are encapsulated within the body or framework of the drone making it necessary for a human or a robotic manipulator to perform several mechanical operations to replace the battery requiring the drone to be taken out of operation during the process. As described herein, the presently disclosed subject matter involves two or more battery modules mounted on the drone body in such a way the drone can autonomously change its own batteries.

With modular batteries attached to the top of the drone, and with the change-out methodology presently disclosed, there is always at least one modular battery attached to the drone. All on-board functionality can be powered by one modular battery, i.e., all other battery modules can be removed without impairing operation, even though the duration of operation is obviously limited.

When two modular batteries come into contact with one another during the coupling phase, the module coupler (male) on one modular battery slides into the module coupler (female) on the other modular battery. The slanted contours of the module couplers cause the modular batteries to automatically align. The upward pressure of the drone pushes the module coupler (male) to a point where the spring-loaded flange clears the edge of the module coupler (female) and engages. This secures the physical connection of the two modular batteries. During coupling, the electrical connectors on each modular battery also come in contact with each another, thus forming the electrical connection between the module batteries.

For uncoupling (either from the charging station or the stress frame), a signal causes a decoupling solenoid to temporarily disengage the spring-loaded flange, thus freeing the modular battery for removal.

Figure 19:
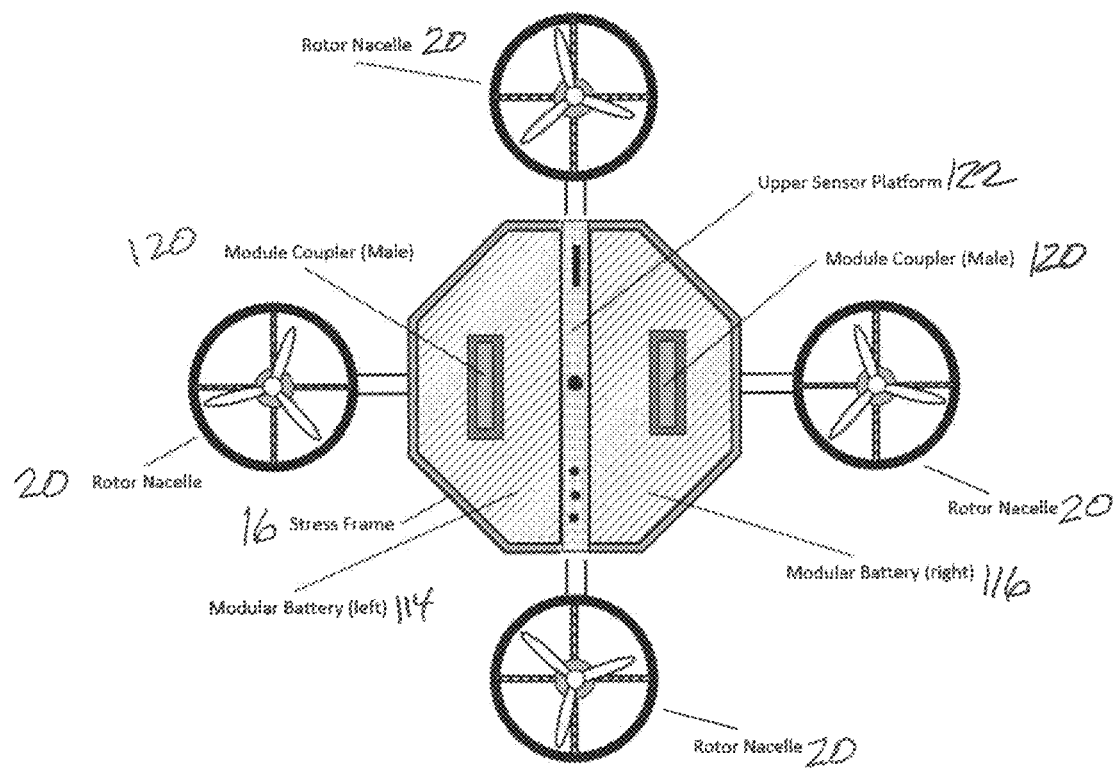
FIG. 19 illustrates in top schematic view an exemplary embodiment of a modular drone in accordance with presently disclosed subject matter, in a 4-rotor configuration assembly, and illustrating an exemplary upper sensor platform carrying camera, sensor, and/or antenna features as used for flight operations.

FIG. 19 illustrates in top schematic view an exemplary embodiment of a modular drone in accordance with presently disclosed subject matter, in a 4-rotor configuration assembly, and illustrating an exemplary upper sensor platform 122 carrying camera, sensor, and/or antenna features as used for flight operations. A similar area (i.e., the lower sensor platform) is provided on the bottom of the stress frame, i.e., underside of the drone. Each rotor nacelle 20 in this exemplary embodiment may be on the order of 2 feet in diameter and extends about 1 foot from the drone body. The drone body (i.e., stress frame) is approximately 4 feet across. Therefore, the total footprint of the drone is approximately 10 feet×10 feet.

Figure 20:
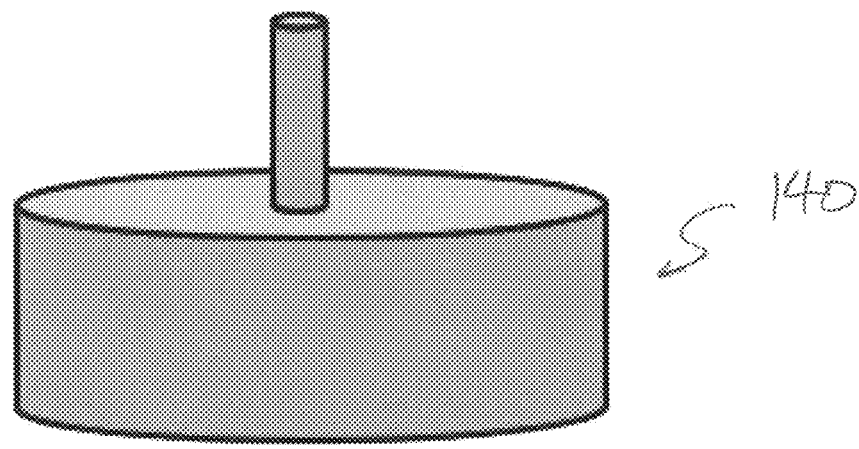
FIG. 20 illustrates in side view an exemplary embodiment of an autonomous water container in accordance with presently disclosed subject matter.

When using thousands of drones in fighting a wildfire, the drones must be able to refill a water/retardant container autonomously without human interaction. One exemplary embodiment of an autonomous water container is a cylindrical tank, as shown in FIG. 20. More particularly, FIG. 20 illustrates in side view an exemplary embodiment of an autonomous water container in accordance with presently disclosed subject matter.

Although the autonomous water container can be manufactured in virtually any size, the diameter preferably should be equal or less than 4 feet so as to not extend past the edges of the stress frame and interfere with airflow through the rotor nacelles. Table 1 indicates example dimensions and resulting capacities (assuming one gallon=231 cubic inches and one gallon weighs 8.34 pounds).

TABLE 1

| Diameter | Height | Volume | Capacity | Cargo Weight |
| --- | --- | --- | --- | --- |
| 48" (4') | 12" (1') | 21,715 | 94 gallons | 784 lbs |
| 48" (4') | 18" (1.5') | 32,572 | 141 gallons | 1,176 lbs |
| 48" (4') | 24" (2') | 43,429 | 188 gallons | 1,568 lbs |

Figures 21A, 21B:
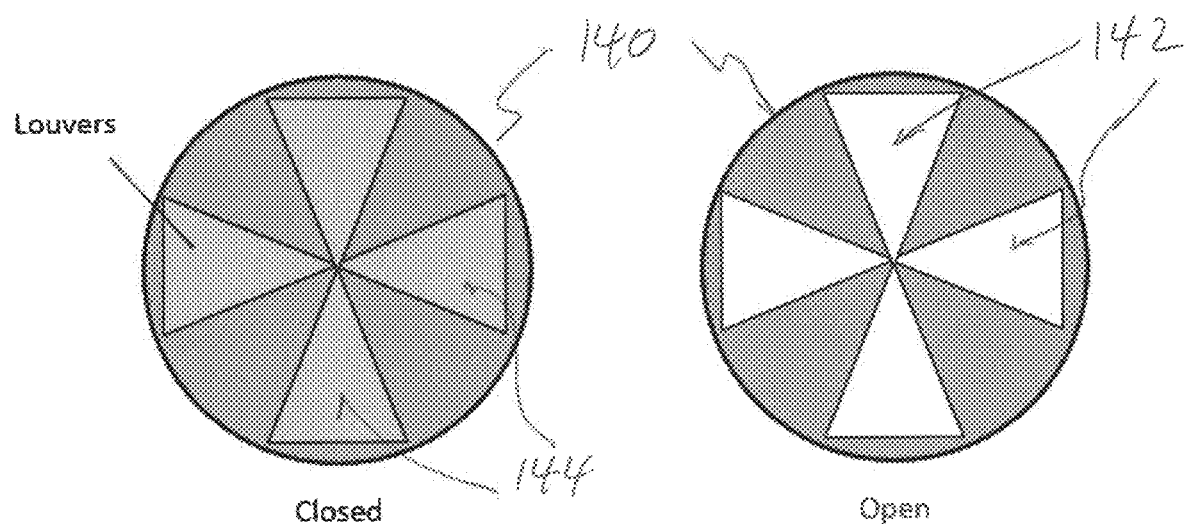
FIGS. 21A and 21B illustrate, respectively, in bottom views, an exemplary embodiment of an autonomous water container in accordance with presently disclosed subject matter, in closed and open louver positions thereof.
Figure 22:
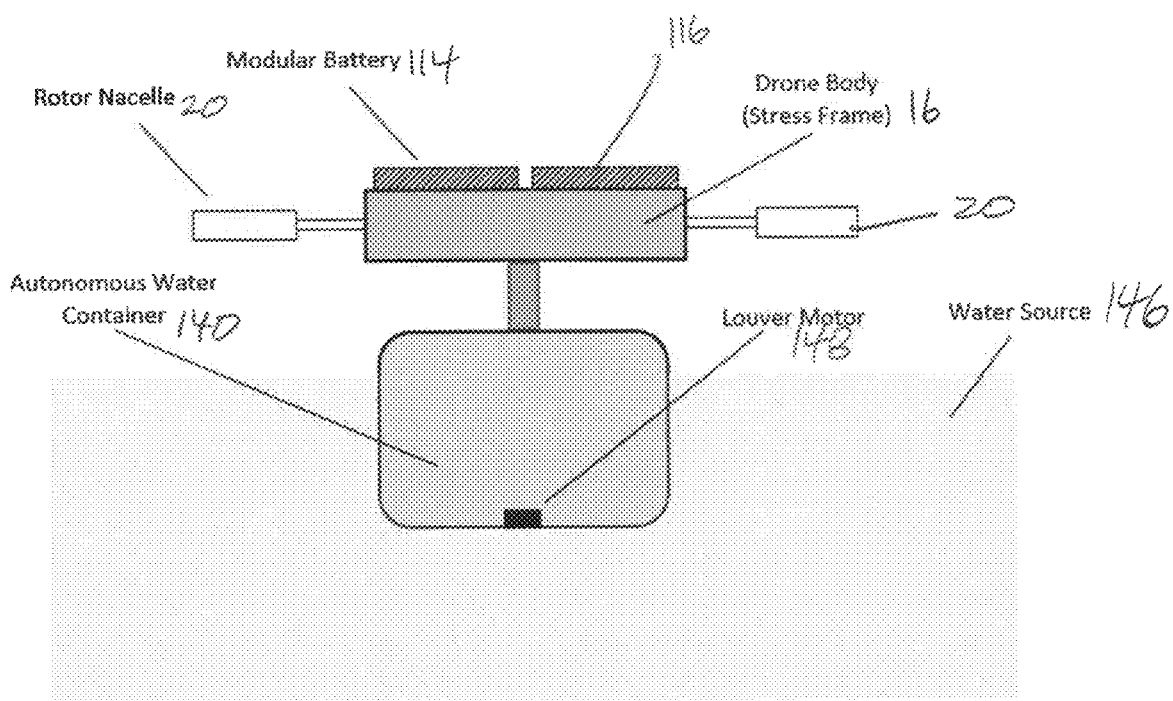
FIG. 22 represents in side schematic view the filling of an exemplary autonomous water container (as represented in FIGS. 20 through 21B), attached to a representative presently disclosed subject matter modular drone, drawing water from a water source, in accordance with presently disclosed subject matter.

The autonomous water container is attached to the cargo support spine 24 (FIG. 3) on the stress frame generally 18. The bottom of the autonomous water container has openings 142 with louvers 144, as shown in FIGS. 21A and 21B. In particular, FIGS. 21A and 21B illustrate, respectively, in bottom views, an exemplary embodiment of an autonomous water container generally 140 in closed and open louver positions thereof, respectively. FIG. 22 represents in side schematic view the filling of an exemplary autonomous water container 140 (as represented in FIGS. 20 through 21B), attached to a representative presently disclosed subject matter modular drone, drawing water from a water source 146. As illustrated, a louver motor generally 148 may be provided for controlled operation of the louvers 144 to first permit entry of water from water source 146 into container 140, and then to close in order to secure water in container 140 for transport to a later location for release by reopening of the louvers with the louver motor 148. As will be understood from other disclosure included herein, such louver motor 148 and other related features may all be powered by common power bus 36 through connections formed and supported via cargo spine 24.

In particular, to fill the autonomous water container 140, the drone navigates to a water source 146 such as a lake, pond, stream, or ocean as shown in FIG. 22. The drone opens the louvers and then reduces altitude so the container 140 is submerged into the water. The drone then closes the louvers and raises altitude, thereby carrying an amount of water with it. Once over the desired drop zone, the drone opens the louvers allowing the water to exit.

A specific water tank arrangement, as discussed by way of example, can pick up substantially anything (subject to weight considerations). For example, tanks may be used to handle items such as water, gasoline, oil, or compressed gasses. Containers may also be adapted for other types of items (e.g., bulk solids, loose items, and packaged goods). Still further, various pallets may be used, such as with freight or other material. In certain applications, especially if military- or police-oriented, ordinance can be the load (e.g., kinetic, remote-guided, or self-guided forms of ordinance).

In some instances, sensors of various types may be attached and/or supported with either a load or directly onto the drone (e.g., camera, sonar, radar, infrared, and/or auditory sensors).

This written description uses examples to disclose the presently disclosed subject matter, including the best mode, and also to enable any person skilled in the art to practice the presently disclosed subject matter, including making and using any devices or systems and performing any incorporated methods. The scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An integrated modular drone system configurable to meet different mission requirements, comprising at least one modular drone having:
    a drone body supporting at least one removable power module thereon;
    a control module supported on said drone body for controlling operation of said drone;
    a plurality of modular rotor nacelle receivers supported on said drone body;
    at least one modular rotor nacelle for being removably mechanically and electrically connected with at least one of said modular rotor nacelle receivers;
    a main power bus interconnecting said power module with said control module, and interconnecting said removable power module with said modular rotor nacelle receivers for powering said control module and said rotor nacelle whenever said power module and said rotor nacelle are associated with said drone body; and
    a power regulator connected between said power module and said main power bus and said modular rotor nacelle receivers and said main power bus, respectively; and
    wherein said plurality of modular rotor nacelle receivers are supported on said drone body at equidistant intervals around said drone body; and
    said drone includes at least a pair of said modular rotor nacelles for being respectively associated with at least a pair of said modular rotor nacelle receivers.

2. The integrated modular drone system as in claim 1, further comprising eight of said modular rotor nacelle receivers, and an even number of modular rotor nacelles ranging in number from two to eight associated, respectively, with a corresponding number of modular rotor nacelle receivers.

3. The integrated modular drone system as in claim 1, further comprising a cargo support spine on said drone body, for selective removable attachment of cargo to be transported by said drone.

4. The integrated modular drone system as in claim 1, further including a plurality of sensors, supported on said drone body and operatively associated with said control module, to support at least semi-autonomous operation of said drone controlled by said control module.

5. The integrated modular drone system as in claim 4, further including:
    an upper platform formed on said drone body for receiving said sensors; and
    at least one camera and one antenna supported on said upper platform and in operative communication with said control module.

6. The integrated modular drone system as in claim 1, wherein said modular rotor nacelle receivers each respectively form internal receiver walls which include a pair of electrical connectors thereon.

7. The integrated modular drone system as in claim 6, wherein said modular rotor nacelles respectively include:
    a rotor housing;
    a shaft extending from said rotor housing for insertion into an associated modular rotor nacelle receiver, with a pair of electrical contacts extending along a portion of said shaft, for respective contact with internal electrical connectors of an associated modular rotor nacelle receiver;
    a motor support received on said rotor housing;
    a rotor motor received on said motor support; and
    a propeller mounted on said rotor motor.

8. The integrated modular drone system as in claim 1, further comprising a plurality of said at least one drone, each respectively configured with a plurality of modular rotor nacelles to meet a collective mission requirement of said drones.

9. The integrated modular drone system as in claim 8, wherein there are a plurality of said drones for comprising a drone swarm, and each of said drones has a diameter of at least 5 feet for lifting relatively heavier loads, and each of said drones is outfitted with an autonomous water container, for a collective mission of said drones of delivering water to a fire.

10. The integrated modular drone system as in claim 1, further comprising:
    at least four of said modular rotor nacelle receivers supported equidistant about said drone body;
    at least two of said modular rotor nacelle removably mechanically and electrically connected with at least two of said modular rotor nacelle receivers; and
    a pair of modular wing attachments removably mechanically connected with at least two of said modular rotor nacelle receivers.

11. The integrated modular drone system as in claim 10, wherein said modular wing attachments respectively include engines for providing forward thrust for said drone.

12. The integrated modular drone system as in claim 1, wherein said removable power module comprises at least one modular battery, fuel cell, internal combustion engine, or turbine, connected in a plug-and-play fashion with said drone body, and providing electricity to said main power bus for powering said drone including any associated components and modules thereof.

13. The integrated modular drone system as in claim 12, wherein said removable power module comprises a pair of respectively removable and exchangeable modular batteries, which can be changed out one at a time in an autonomous series battery swapping process without powering-down the drone.

14. The integrated modular drone system as in claim 1, wherein said removable power module comprises at least one modular battery.

15. The integrated modular drone system as in claim 14, further comprising at least a pair of said modular batteries, having respective male and female battery module couplers for semi-autonomous support of said modular batteries on said drone body.

16. The integrated modular drone system as in claim 15, further comprising a plurality of stackable pairs of said modular batteries, mechanically and electrically connected together and to said drone body via said male and female battery module couplers thereof.

17. An integrated modular drone system method, configurable to meet different mission requirements, comprising:
 providing at least one modular drone having a drone body supporting at least one removable power module thereon, with a control module supported on such drone body for controlling operation of such drone, and with a plurality of modular rotor nacelle receivers supported on such drone body;
 providing a plurality of modular rotor nacelles for being removably mechanically and electrically connected with corresponding modular rotor nacelle receivers; and
 selectively outfitting such modular drone with a selected number of such modular rotor nacelles, configured to meet mission requirements of such drone system;
 wherein such modular drone further includes a main power bus interconnecting such power module with such control module, and interconnecting such removable power module with such modular rotor nacelle receivers for powering such control module and such rotor nacelle whenever such power module and such rotor nacelle are associated with such drone body; and
 a power regulator connected between such power module and such main power bus and such modular rotor nacelle receivers and such main power bus, respectively; and
 wherein such plurality of modular rotor nacelle receivers are supported on such drone body at equidistant intervals around such drone body; and
 such drone includes at least a pair of such modular rotor nacelles respectively associated with at least a pair of such modular rotor nacelle receivers.

18. The integrated modular drone system method as in claim 17, wherein:
 such plurality of modular rotor nacelle receivers comprise eight of such modular rotor nacelle receivers supported equidistant about such drone body; and
 such selected number of such modular rotor nacelles comprises an even number of modular rotor nacelles ranging in number from two to eight associated, respectively, with a corresponding number of such modular rotor nacelle receivers.

19. The integrated modular drone system method as in claim 17, wherein:
 such modular rotor nacelle receivers each respectively form internal receiver walls which include a pair of electrical connectors thereon; and
 such modular rotor nacelles respectively include:
  a rotor housing;
  a shaft extending from such rotor housing for insertion into an associated modular rotor nacelle receiver, with a pair of electrical contacts extending along a portion of such shaft, for respective contact with internal electrical connectors of
  an associated modular rotor nacelle receiver;
  a motor support received on such rotor housing;
  a rotor motor received on such motor support; and
  a propeller mounted on such rotor motor.

20. The integrated modular drone system method as in claim 17, further comprising providing a cargo support spine on such drone body, and selectively removably attaching cargo to be transported by such drone.

21. The integrated modular drone system method as in claim 17, further including a plurality of sensors, supported on such drone body and operatively associated with such control module, to support at least semi-autonomous operation of such drone controlled by such control module.

22. The integrated modular drone system method as in claim 21, further including:
 an upper platform formed on such drone body for receiving such sensors; and
 at least one camera and one antenna supported on such upper platform and in operative communication with such control module.

23. The integrated modular drone system method as in claim 17, further comprising providing a plurality of such drones, each respectively configured with a plurality of modular rotor nacelles to meet a collective mission requirement of such drones.

24. The integrated modular drone system method as in claim 23, further comprising providing a plurality of such drones operated as a drone swarm, and configuring each of such drones for lifting relatively heavier loads, and outfitting each of such drones with an autonomous water container, and operating such drones for a collective mission of delivering water to a fire.

25. The integrated modular drone system method as in claim 17, further comprising:
 providing at least four of such modular rotor nacelle receivers supported equidistant about such drone body;
 providing at least two of such modular rotor nacelle removably mechanically and electrically connected with at least two of such modular rotor nacelle receivers; and
providing a pair of modular wing attachments removably mechanically connected with at least two of such modular rotor nacelle receivers.

26. The integrated modular drone system method as in claim 25, wherein such modular wing attachments respectively include engines for providing forward thrust for such drone.

27. The integrated modular drone system method as in claim 17, wherein such removable power module comprises at least one modular battery, fuel cell, internal combustion engine, or turbine, connected in a plug-and-play fashion with such drone body, and providing electricity to such main power bus for powering such drone including any associated components and modules thereof.

28. The integrated modular drone system method as in claim 27, wherein:
 such removable power module comprises a pair of respectively removable and exchangeable modular batteries; and
 such method further comprises changing such modular batteries out one at a time in an autonomous series battery swapping process without powering-down the drone.

29. The integrated modular drone system method as in claim 17, wherein such removable power module further comprises at least a pair of modular batteries, having respective male and female battery module couplers for semi-autonomous support of such modular batteries on such drone body.

30. The integrated modular drone system method as in claim 29, further comprising a plurality of stackable pairs of such modular batteries, mechanically and electrically connected together and to such drone body via such male and female battery module couplers thereof.

* * * * *